(12) United States Patent
Ferrin et al.

(10) Patent No.: US 7,080,916 B1
(45) Date of Patent: Jul. 25, 2006

(54) SPECIAL EFFECTS DRINKING LID AND STRAW

(75) Inventors: Richard Gregory Ferrin, Anaheim, CA (US); Pascual Jose Lionel Wawoe, Los Angeles, CA (US)

(73) Assignee: Jim McCafferty Productions, Inc., Santa Ana, CA (US)

( * ) Notice: Subject to any disclaimer, the term of this patent is extended or adjusted under 35 U.S.C. 154(b) by 8 days.

(21) Appl. No.: 10/852,472

(22) Filed: May 24, 2004

Related U.S. Application Data

(60) Provisional application No. 60/472,872, filed on May 23, 2003.

(51) Int. Cl.
*F21V 33/00* (2006.01)

(52) U.S. Cl. .................. 362/96; 362/253; 362/183; 220/705; 340/682; 239/33

(58) Field of Classification Search ............... 220/705, 220/709; 362/96, 253, 800, 806, 183, 101; 340/692, 384.1; 239/33; 359/626, 619
See application file for complete search history.

(56) References Cited

U.S. PATENT DOCUMENTS

| | | | | |
|---|---|---|---|---|
| 4,121,835 A | * | 10/1978 | Garabedian | 369/68 |
| 4,483,450 A | * | 11/1984 | Sanchez | 215/254 |
| 4,631,715 A | * | 12/1986 | Hoover | 369/68 |
| 5,070,435 A | * | 12/1991 | Weller | 362/101 |
| 5,119,279 A | * | 6/1992 | Makowsky | 362/101 |
| 5,171,081 A | * | 12/1992 | Pita et al. | 362/34 |
| 5,211,699 A | * | 5/1993 | Tipton | 362/101 |
| 5,609,409 A | * | 3/1997 | Diehl | 362/101 |
| 5,722,590 A | * | 3/1998 | Miller | 239/33 |
| 5,739,758 A | * | 4/1998 | Driska et al. | 340/692 |
| 5,785,406 A | * | 7/1998 | Lee | 362/96 |
| 5,931,558 A | * | 8/1999 | Chen | 362/101 |
| 6,024,624 A | * | 2/2000 | Lee | 446/81 |
| 6,352,352 B1 | * | 3/2002 | Schletterer et al. | 362/183 |
| 6,903,874 B1 | * | 6/2005 | Karterman | 359/626 |

* cited by examiner

*Primary Examiner*—Sameh H. Tawfik
(74) *Attorney, Agent, or Firm*—The Walker Law Firm; Allan Grant

(57) ABSTRACT

The present invention is for special effects drinking lid and straw, which can be used with various drinking containers. The specially designed container lid has special effects mechanisms that can illuminate the container lid, the container itself, the straw as well as figures, objects and designs connected to the lid and/or straw. Different special effects mechanisms can be used to produce light, sound, create movement in a moveable object, and/or produce a distinctive aroma or odor from a drinking container lid.

52 Claims, 20 Drawing Sheets

SPECIAL EFFECTS DRINKING LID AND STRAW

CROSS-REFERENCE TO RELATED APPLICATIONS

The present application claims priority under 35 U.S.C. 119(e) and under all applicable U.S. statutes and regulations, to U.S. Provisional Application Ser. No. 60/472,872, filed May 23, 2003. The disclosure of which is hereby incorporated herein by reference in its entirety.

FIELD OF THE INVENTION

The present invention involves a specially designed container lid, which can be used with various drinking containers and straws in general. In particular, the present invention includes a device that can be used to entertain, advertise, and promote the sale of specific consumer goods and/or services. Inside the specially designed container lid is a special effects mechanism that can illuminate the container lid, the container itself, the straw as well as figures, objects and designs connected to the lid and/or straw. Different special effects mechanisms can be used to produce light, sound, create movement in a moveable object, and/or produce a distinctive aroma or odor from a drinking container lid.

In particular, this invention embodies an illuminated lid that allows for a straw(s) to be permanently or temporarily connected to the lid in order to illuminate the attached straw(s) itself.

The present invention also relates specifically to straws where the special effects mechanisms can be activated by: (1) a manual switch, (2) the flow of liquid through the straw ("drink activated") and/or (3) a change in the decibel level ("sound activated").

Another feature of this invention is the alternative uses for the container lid. It can be used as: (1) an illuminated flying disk; (2) an illuminated button to be attached to an article of clothing, backpack, purse or the like; (3) a decorative piece that entertains and advertises; and/or (4) a decorative piece that can be attached to a drink container to illuminate the container, lid, straw, figures, objects and the liquid contents of a drinking container.

A further characteristic of the container lid is its ability to have removable figure(s), symbol(s), or object(s) attached to it. Such figures or objects can be used as: (1) an antenna topper; (2) a pin to be clipped to an article of clothing or the like; (3) a game piece or icon; and/or (4) a toy.

BACKGROUND OF THE INVENTION

A variety of similar devices have been used on drinking containers, container lids, and straws for the purpose of entertainment and/or advertising.

The following are prior art devices concerning the illumination of containers and lids:

U.S. Pat. No. 6,352,352 Luminescent Container With Quick-Charging Power Source, issued Mar. 5, 2002.

U.S. Pat. No. 5,931,558 Gleamy Goblet Structure, issued Aug. 3, 1999.

U.S. Pat. No. 5,609,409 Chemiluminescent Stemmed Drinking Glass, issued Mar. 11, 1997.

U.S. Pat. No. 5,575,553 Container Using Fiber Optic Imaging, issued Nov. 19, 1996.

U.S. Pat. No. 5,211,699 Lighted Drinking Glass, issued May 18, 1993.

U.S. Pat. No. 5,171,081 Chemiluminescent Reactive Vessel, issued Dec. 15, 1992.

U.S. Pat. No. 5,119,279 Lighted Drinking Vessel, issued Jun. 2, 1992.

U.S. Pat. No. 5,070,435 Illuminated Scenic Glass, issued Dec. 3, 1991.

U.S. Pat. No. 4,563,726 Illuminated Chemiluminescent Drinking Mug, issued Jan. 7, 1986.

U.S. Pat. No. 4,483,450 Container and Removable Lid Therefor, issued Nov. 20, 1984.

U.S. Pat. No. 3,735,113 Optical Display, issued May 22, 1973.

All of the patents listed above, achieve their illuminating effect by transmitting the light source through the base, the stem or sidewalls of the drinking container. None of the previously patented containers can be illuminated from the lid of the container nor can the lid of the drinking container be illuminated itself. Additionally, none of the prior art containers can be illuminated from a light source in the lid of the container angled or pointed downwards to internally illuminate the container and its liquid contents from within. Furthermore, the bubbles from a carbonated drink can further enhance the illuminating effect.

A major disadvantage with the existing illuminated drinking containers is that it requires the specific use of the specially designed container in order to achieve the illuminating effect. The illuminating effect cannot be utilized in conjunction with any other drinking container commonly found in fast food restaurants, gas stations, mini-marts, and amusement parks. With the Special Effects Lid however, illumination can be accomplished when used with any of the existing beverage containers currently out on the market since its light source comes from the lid. The most dramatic visual illuminating effect is achieved when a white plastic container is filled with a clear liquid and used in a dark setting. If lights are placed near center of the container lid and those the lights are angled straight down into the drinking container (cup), illumination in the drinking container will be enhanced.

A second disadvantage of the current illuminating drinking containers is that the illuminating mechanism is created within the container (cup) itself. Thereby making such containers more expensive to make and more time consuming to manufacture than the average plastic/paper beverage cup. Further, due to this specific design feature, such drinking containers would naturally be thicker and bulkier therefore, requiring greater storage and display space. Unlike the Special Effects Lid which can be easily stored and simply paired with a corresponding sized cup/container that the average food and beverage merchant would already have in stock.

Typically, advertisers want to vary the promotions being displayed on drinking containers to reflect the public's interest. With the traditional illuminating container that would be difficult if not inefficient to achieve since it would require the mass manufacturing of brand new containers whenever a change is necessary. Conversely, since the special effects lid permits the attachment or removal of various promotional toys, figures, objects, or symbols to the lid, container, or straw, only that removable object need be altered or modified.

A fourth disadvantage of the current illuminating drinking containers is the difficulty of washing it for reuse. Requiring special care not to damage the mechanism inherent in the container/cup. The special effects lid, guards against that problem by creating its illuminating device in the lid and not in the container where the liquid will be held. Additionally, the container lid can be sealed to be water tight.

Accordingly, there is a significant need in the art for an improved drinking container lid which can be attached to any drinking container and be used for entertainment, advertising or in the promotional sale of certain consumer goods and/or services.

None of the prior art has used a container lid as an illuminating flying disk or as an illuminating button that can be attached to an article of clothing, backpack, purse or the like.

Furthermore, none of the prior art mentioned above has incorporated a lighting mechanism and/or other mechanisms that can produce sound, create movement, and/or generate a distinctive smell. Those mechanisms are special effects mechanisms that can be used to entertain, advertise or promote the sales of specific consumer goods and/or services.

No prior art has utilized special effects drink container lid and straw and equip it with a smell producing mechanism to entertain, advertise or promote the sales of specific consumer goods and/or services. Nor has any one utilized a smell producing mechanism in combination with other mechanisms that can produce sound, create movement, and/or generate light.

The following prior art devices have been developed to provide illumination in straws:
U.S. Pat. No. 5,722,590 Illuminated Straw Device, issued Mar. 3 1998.
U.S. Pat. No. 5,931,383 Self-Illuminated Drinking Straw, issued Aug. 3, 1999.
U.S. Pat. No. 6,024,624 Novelty Article, issued Feb. 15, 2000.

The above listed illuminating straw patents have achieved an illuminating effect through the use of chemiluminescent mixtures and strips of illuminating material being placed on or around the straw. Although some of the prior art devices include an illuminating straw, no prior art involves a straw that is illuminated from the drinking container lid. Similarly, none of the prior art describes a straw that can be internally and/or externally illuminated by the placement of lights in, around, or against the straw. Further, none of the prior art devices utilized an illuminating drinking container lid to illuminate an ordinary drinking straw, a straw with a notch, and/or a straw with a recess.

Nor has any of the above prior art disclosed a straw that permits a notch to be placed in the straw wall. Additionally, none of the prior art has disclosed a light that can be placed in the notch of the straw wall. Nor, has any of the prior art disclosed a straw that can have at least one light in the notch of the straw wall. Further, none of the above prior art described a straw that can have a notch positioned around the point at which light or lights are inwardly directed towards the straw to enhance the straw's internal and external illumination. This feature of the invention achieves the best illumination in the straw by positioning the light in the notch of the straw, which increases the internal and external reflection in the straw.

Additionally, the notch in the straw allows the straw to be temporarily secured into place with the lid. By securing the desired placement of the straw in relation to the container lid the optimum angle of illumination can be achieved.

Nor has any of the above prior art disclosed a straw that permits a recess to be placed in the straw wall. Additionally, none of the prior art has disclosed a light that can be placed inside the recess of the straw wall. Nor, has any of the prior art disclosed a straw that can have at least one light angled upward or downward inside the recess of the straw wall. To achieve the best illumination in the straw regarding this recess feature, the straw should have one recess angled upward and another recess angled downward and have a light be positioned inside each of the recesses of the straw wall to illuminate that portion of the straw.

Nor, has any of the above prior art disclosed a light and/or lights that are connected to a spring that can be positioned in and/or around the straw hole of the container lid to illuminate either an ordinary straw, a straw with a notch, and/or a straw with a recess. By equipping the light with a spring, illumination can be further enhanced since the light can be position against the straw wall in a notch or a recess of the straw.

Additionally, none of the above prior art has disclosed a devise that has the capacity to illuminate more than one straw at a time. Nor has any of the prior art disclosed a straw that can have rounded ends at the top and bottom of the straw for better light refraction, thereby enhancing the internal illumination in the straw. None of the prior art has used a straw that is made out of a transparent or semi transparent material to enhance the illuminating effect in the straw. Nor have they been able to achieve illumination in ordinary plastic straws commonly found in restaurants, gas stations, mini-marts, and amusement parks. Alternatively, none of the prior art has used a black light to illuminate a white straw. However, the best illuminating effect would be achieved by using the Special Effects Container Lid with a non-black light and a straw made with transparent or semi transparent material.

This invention in alternative embodiments allows a straw or straws to be permanently or temporarily connected to the container lid to achieve illumination in the straw.

A disadvantage with the traditional illuminating straw is that the specially manufactured straw must be used in order to achieve the illuminating effect. With the Special Effects Container Lid, any drinking straw found at fast food restaurants, gas stations, mini-marts, and amusement parks, can be attached to produce the glowing effect in the straw.

A further disadvantage of the existing illuminating straws is that they cannot be internally illuminated. Such straws currently achieve their glowing quality through the chemical use of chemiluminescent mixtures or by wrapping strips of illuminating material around the straw.

The following prior art devices have been developed to provide sound generating capabilities in container lids and straws:
U.S. Pat. No. 6,024,624 Novelty Article, issued Feb. 15, 2000.
U.S. Pat. No. 5,739,758 Sound Generating Drinking Container, issued Apr. 14, 1998.
U.S. Pat. No. 4,631,715 Audio Straw and Cup Lid, issued Dec. 23, 1986.
U.S. Pat. No. 4,121,835 Sound Producing Straw, issued Oct. 24, 1978.
U.S. Pat. No. 3,122,959 Musical Straw Means, issued Jan. 28, 1963.

Although some of the prior art devices disclose sound producing capabilities in drinking container lids, none of the above listed patents incorporate the sound generating device along with a light mechanism that can illuminate the drinking container lid, the container, the liquid (beverage) inside the container and/or the attached straw. Additionally, none of the prior art has incorporated the sound generating device and a smell generating mechanism together. Nor has any prior art incorporated an sound generating device with a movement creating mechanism. Furthermore, none of the prior art has incorporated the sound generating device and a lighting mechanism with an additional mechanism that can produce movement and/or generate a unique odor or scent. Distinct features, that will create a unique product that can serve to entertain, advertise, and promote the sales of specific consumer goods and/or services.

None of the prior art has disclosed a mechanism that creates movement in a object attached to the drinking container lids. Nor has any drinking container lid been designed to allow an object to be put into motion. (i.e. a train figure moving designed to move in a clockwise or counter clockwise motion around the container lid). Nor has any drinking container lid been designed with a mechanism that can be attached to an object to allow for movement. Further, none of the prior art has incorporated such a movement creating mechanism in a drink container lid to create special effects that entertain, advertise, and promote the sales of certain consumer goods and/or services. Nor has any movement creating mechanism been used in combination with other special effects producing mechanisms to create a unique product that can serve to entertain, advertise, and promote the sales of specific consumer goods and/or services.

The special effects mechanism can be activated by: (1) a manual switch, (2) the flow of liquid through the straw ("drink activated"), and/or (3) a change in the decibel level ("sound activated").

If the special effects mechanism, is activated by a manual on/off switch any straw commonly found in restaurants, gas stations, mini-marts, and amusement parks can be illuminated when the Special Effects Container Lid is utilized with the straw.

While various drinking straws have been developed to generate special effects only a few straws have been developed to activate the special effects when liquid flows through the straw (see, U.S. Pat. Nos. 6,024,624 and 5,785,406).

For U.S. Pat. No. 6,024,624 to operate, the straw requires that a pair of "electrical contacts" wires extend into the passageway of the straw. When the liquid passes through the passageway of the straw, the liquid connects the circuit gap activating the mechanisms that produce the special effects.

A major problem with that invention is that you are required to use the same straw because that straw has a pair of "electrical contacts" that extend into the passageway of the straw. The "electrical contacts" that protrude into the passageway of the straw are necessary for the activation of the special effects mechanisms. When liquid is sucked into the passageway of the straw, the liquid becomes a conductor of electricity between the "electrical contacts". A further disadvantage of this invention is that the electrical contacts will erode due to the general exposure with liquid when drinking occurs.

In order to activate the special effects by use of liquid flowing through a straw, U.S. Pat. No. 5,785,406, requires that an "oscillating circuit provide a constant frequency to a sensor pad through a touch detection circuit" and the sensor pad be placed against the straw body. When liquid passes through the passageway of the straw, the amount of the surrounding static electricity around the sensor pad is changed, causing the oscillation frequency of the oscillatory circuit to be changed which activates the mechanisms that produces the special effects.

A similar disadvantage of that invention is that you are again required to use the same straw, since the straw is mounted to the container, which holds the circuit boards and sensor pads.

In view of the above mentioned prior art, there is a need for a simpler more efficient mechanism for activating special effects when liquid is sucked through the passageway of the straw.

In view of the above mentioned disadvantages there is a need for an improved novelty article, that can be drink activated and utilize a removable straw. This invention can overcome the above mentioned disadvantages by utilizing a photo cell that senses changes in luminosity. The photo cell can either be used by itself or in conjunction with a light emitter to sense a change in luminosity. If a photo cell is used with a light emitter, a more accurate method of activating the special effects drink container lid can be achieved. However, the straw must be made of a transparent or semi-transparent material, in order to utilize the photo cell and make the novelty article "drink activated".

None of the prior art devises have utilized a transparent or semi transparent straw with a photo cell for activating the special effects mechanism when liquid is sucked into the passageway of the straw. Nor, has any of the prior art describe a photo cell positioned around the straw hole(s) inside a container lid. Similarly, none of the prior art has utilized a photo cell that was directed into the passageway of a clear or semi transparent straw to achieve activation in special effects mechanisms when liquid flows through the straw. Nor, has any of the prior art described a devise, which allows a straw(s) to be removed and then inserted back into a container lid, and still trigger the special effects mechanism when liquid is sucked into the passageway of the straw.

Nor has any of the prior art devises utilized a transparent or semi transparent straw with an emitter light and a photo cell detector for activating the special effects mechanism when liquid is sucked into the passageway of the straw. Nor, has any of the prior art describe an emitter light and a photo cell detector positioned around the straw hole(s) inside a container lid. Similarly, none of the prior art has utilized an emitter light and a photo cell detector that was directed into the passageway of a clear or semi transparent straw to achieve activation in special effects mechanisms when liquid flows through the straw. Nor, has any of the prior art described a devise, which allows a straw(s) to be removed and then inserted back into a container lid, and still trigger the special effects mechanism when liquid is sucked into the passageway of the straw.

Although the prior art switch uses electricity to activate the special effects mechanism, such use is not the most simplistic and efficient mechanism for activation. It would be more simplistic and efficient to use a photo cell as described above.

Additionally, drink activation could also be achieved through the use of a magnet switch that is positioned around the straw hole(s) inside a container lid and a corresponding magnet can be positioned adjacent to the straw passageway. The corresponding magnet has an arm that is permanently connected to it. The arm extends outwardly beyond the cylinder wall of the lid and into the passageway of the straw. When liquid is sucked up the straw, the arm and attached magnet are moved in an upward direction from the point of rest. The upward movement in the arm and attached magnet cause a corresponding magnet to also be moved upward thereby activating the special effects mechanisms. However, this drink activated mechanism can not use a removable straw.

Alternatively, activation could also be achieved through the use of a sound activated mechanism designed to sense changes in the decibel level and thereby turn on and/or off the special effects when a change in the decibel level occurs.

The special effects mechanisms can illuminate lids, containers, straws, figures, objects and/or designs, and produce sound, create movement and/or produce a distinctive smell and/or sound.

Since plastic and paper drinking containers/cups exist in almost every establishment where food and beverages are sold, vendors, merchants, or advertisers need only pair their specially designed special effects lid with those existing containers/cups to advertise and promote the sale of their particular product. The Special Effects Lid avoids the inconvenience of shipping quantities of large and bulky containers/cups to various locations by utilizing those containers/cups that the average food and beverage vendor would already have in stock.

Additionally, none of the prior art has disclosed a container lid that can be used as: (1) an illuminated flying disk; (2) an illuminated button to be attached to an article of clothing, backpack, purse or the like; or (3) a decorative piece to be attached to a drink container to illuminate the container and its contents.

Furthermore none of the prior art has disclosed a special effects container lid that has the ability to have figure(s), symbol(s), or object(s) easily removed from the lid, container, and/or straw so that such figures or objects can be used as: (1) an antenna topper; (2) a pin to be clipped to an article of clothing or the like; (3) a game piece or icon; or (4) a toy.

Furthermore none of the prior art has disclosed a special effects container lid that has the ability to stimulate the senses (sight, sound, and smell) of the average consumer. If a manufacture of a new soft drink wants to promote the new drink, he could utilize the special effects container lid and equip it with a smell generator that is cherry scented and have the special effects container lid drink activated. So when the consumer drinks his cherry flavored soda he not only has his sense of taste stimulated by the cherry flavoring in the soda, he also has his sense of smell stimulated by the scent of cherries from the smell generator.

SUMMARY OF THE INVENTION

To avoid some of the problems inherent in the currently patented illuminated drinking containers, it is the objective of the present invention to provide an illuminating drinking container by constructing the special effects device in the container's lid. The specific creation of the special effects device in the container's lid allows for the illumination of the drinking container lid, the container, and the straw. The special effects device can also allow for the production of sound and the creation of movement and/or production of a distinctive smell and/or aroma.

It is the object of the present invention to provide a drinking container lid that has a lighting mechanism to provide an illuminating effect in the drinking container lid, the container, the liquid (beverage) inside the container, the straw, figures, and/or the objects attached to the lid and/or straw. It is a further object of this invention to take advantage of the illumination in the container lid, container, straw, figures, and/or objects attached to the lid to advertise and/or promote the sale of specific consumer goods and/or service since the illumination creates such an eye-catching display.

It is another object of the present invention to provide a drinking container lid that can have one or more lights directed downward from the lid into the container to illuminate the container and its liquid contents. It is a further object of the present invention to enhance the illuminating effect in the container by placing the lights near the center of the container lid and angled straight down. The illumination of the container from within, creates an excellent surface on which an advertisement could be placed.

It is further an object of the present invention to provide a drinking container lid in one embodiment that can have one or more lights positioned at, around, or near the straw hole or holes of the lid in order to illuminate the inserted straw or straws itself. Similarly, another embodiment of the present invention is to provide a drinking container lid that can have one or more lights positioned within the straw hole or holes to achieve a greater illuminated effect in the straw(s).

It is another object of the present invention to provide another alternative embodiment where a drinking container lid can have one or more light sources that could be permanently or temporarily connected to the straw to internally and/or externally illuminate the straw.

It is another object of the present invention to utilize a straw with a recess placed in the straw wall in one embodiment. It is an object of the present invention to provide a drinking container lid that could have a straw permanently connected to it that allows for the illumination of the top and/or bottom half of the straw by positioning the light inside the recess of the straw wall angled either upwardly and/or downwardly respectively to illuminate that portion of the straw. It is another object of the present invention in an alternative embodiment to position the light around the recess of the straw wall.

It is another object of the present invention to utilize a straw with a notch placed in the straw wall in another embodiment. It is an object of the present invention to provide a straw that can include a notch at the point where light(s) can be shined from a position at or around the straw hole of the lid into the straw itself in order to produce an illuminating effect in the straw. It is another object of the present invention in an alternative embodiment to provide an even more dramatic illuminating effect in the straw by positioning the light(s) within the straw hole of the container lid and against or beside the notch in the straw. Still another function of the notch in the straw is to allow for the straw to be secured into place with the lid. By securing the straw in place with the container lid through the use of a notch, the optimum illuminating effect can be achieved.

It is another object of the present invention in an alternative embodiment to provide a light and/or lights that are connected to a spring that can be positioned in and/or around the straw hole of the container lid to illuminate either an ordinary straw, a straw with a notch, and/or a straw with a recess.

It is another object of the present invention to provide straws that can have a rounded end(s) at the top and/or bottom of the straw for better light refraction, thereby enhancing the internal illumination in the straw.

It is another object of the present invention to provide a straw(s) that could have a thick wall to allow for a notch and/or a recess to be positioned in the straw wall of the straw. It is another object of the present invention to provide a straw(s) that could have a thick wall to allow for the positioning of one or more lights inside the wall of the straw. Another purpose for creating a thick straw is to allow for a design to be carved, etched, or molded that can advertise and/or promote the sale of certain consumer goods and/or services. The illumination of the carved, etched, or molded design creates an eye-catching display for advertisement purposes.

It is yet another object of the present invention to provide a drinking container lid having one or more lights directed upwardly to illuminate one or more figures or objects permanently or temporarily attached to the lid and/or straw.

It is an object of the present invention to provide a drinking container lid having one or more lights to internally illuminate the lid from within. It is also object of the present invention to provide reflective angles for light inside the container lid to enhance the illuminating effect. It is a further object of the present invention to provide reflective angles for light on the container lid to maximize the illuminating effect. It is an additional object of the present invention to provide a lid having one or more lights directed outwardly from the edge of the lid. It is an object of the present invention to provide a drinking container lid having a lighting mechanism incorporated into the lid of the drinking container to provide an illuminating effect in the container lid, container, straw, figures and/or objects. The illumination of the lid from within also creates an appropriate surface on which an advertisement could be placed.

It is an object of the present invention to provide a drinking container lid that has a mechanism that can produce a smell or an odor in the container lid. By utilizing a special effects drink container lid that is equip with a smell producing mechanism the special effects container lid can entertain, advertise or promote the sales of specific consumer goods and/or services.

It is an object of the present invention to provide a drinking container lid that has a mechanism that can move a moveable object that is connected to the lid. It is another object of the present invention to provide a drinking container lid having one or more paths in which a moveable object can be placed into motion. It is an additional object of the present invention to provide a drinking container lid with a motion creating mechanism that can be attached to a movable object to allow that object to move. The moveable object creates an eye-catching display for advertisement purposes.

Furthermore, it is an object of this invention to provide a container lid that provides special effects that can stimulate the senses (sight, sound, and smell) of the average consumer. By stimulating the senses of the consumers through the use of special effects an advertiser can create a lasting impression in the product(s) advertised.

It is an object of the present invention to provide special effects mechanisms within the container lids that can produce light, sound, movement and/or smell.

It is an object of the present invention to provide a drinking container lid that can be used as: (1) an illuminated flying disk; (2) an illuminated button to be attached to an article of clothing, backpack, purse or the like; (3) a decorative piece that entertains and advertises; and/or (4) a decorative piece that can be attached to a drink container to illuminate the container, lid, straw, figures, objects and the liquid contents of a drinking container.

It is an object of the present invention to provide a drinking container lid that has the ability to have figure(s), symbol(s), or object(s) easily removed from the lid, container, and straw and that such figures or objects can be used as: (1) an antenna topper; (2) a pin to be clipped to an article of clothing or the like; (3) a game piece or icon; and/or (4) a toy.

It is an object of the present invention to provide a special effects mechanisms that can be activated by: (1) a manual switch, (2) the flow of liquid through the straw ("drink activated"), (3) by a manual switch at first then subsequently activated when liquid flows through the straw, and/or (4) a change in the decibel level ("sound activated").

It is an additional object of the present invention in an alternative embodiment to provide a clear straw made out of transparent or semi transparent material so that the photo cell can activate the special effects mechanism when liquid is sucked into the passageway of the straw.

It is another object of this invention to utilize a photo cell that is positioned within the container lid at or in the straw hole for the photo cell to activate the special effects mechanisms when liquid flows through the straw itself. It is still another object of this invention to allow a straw(s) to be removed and then inserted back into a container lid, and still trigger the special effects mechanism when liquid is sucked into the passageway of the straw.

It is another object of the present invention in an alternative embodiment to provide an emitter light and a photo cell detector to activate the special effects mechanism when liquid is sucked into the passageway of the straw. It is another object of this invention to utilize an emitter light and a photo cell detector positioned across from one another within the container lid at or in the straw hole for the photo cell detector to activate the special effects mechanisms when liquid flows through the straw itself. It is still another object of this invention to allow a straw(s) to be removed and then inserted back into a container lid, and still trigger the special effects mechanism when liquid is sucked into the passageway of the straw.

It is another object of the present invention in another alternative embodiment to provide a straw that is permanently connect to the container lid, where a magnet switch can be positioned around the straw hole inside a container lid, have a corresponding magnet positioned adjacent to the straw passageway. Said corresponding magnet has an arm that is permanently connected to the magnet. The arm of that magnet extends outwardly beyond the straw wall of the lid and into the passageway of the straw, where the liquid travels. When liquid is sucked up the straw, the arm and attached magnet are moved in an upward direction from a point of rest. The upward movement in the arm and attached magnet cause a corresponding magnet attached to the switch to also be moved upward thereby activating the special effects mechanisms.

It is another object of the present invention in another alternative embodiment to provide a sound activated switch, where a change in the decibel level can trigger the special effects mechanisms.

It is also an object of the present invention to provide a lighting mechanism for a lid that is easy to manufacture, simple to assemble, reliable in operation, and relatively inexpensive to produce.

Further, by using the inventive structures discussed above, any image sculpted, molded, etched, or embossed into the lid, container, or straw can be illuminated, creating a unique and distinct product ideal for advertising and general promotions.

It is an object of the present invention to provide a mechanism that can be adapted to generate special effects for a lid that is easy to manufacture, simple to assemble, reliable in operation, and relatively inexpensive to produce.

This invention creates a functional drinking apparatus with toy-like qualities that would truly leave a lasting impression.

BRIEF DESCRIPTION OF THE DRAWINGS

These as well as other features of the present invention will become more apparent upon reference to the accompanying drawings wherein like numerals designate corresponding parts in the several figures summarized as follows.

DETAILED DESCRIPTION OF THE PREFERRED EMBODIMENTS

Figure 1:
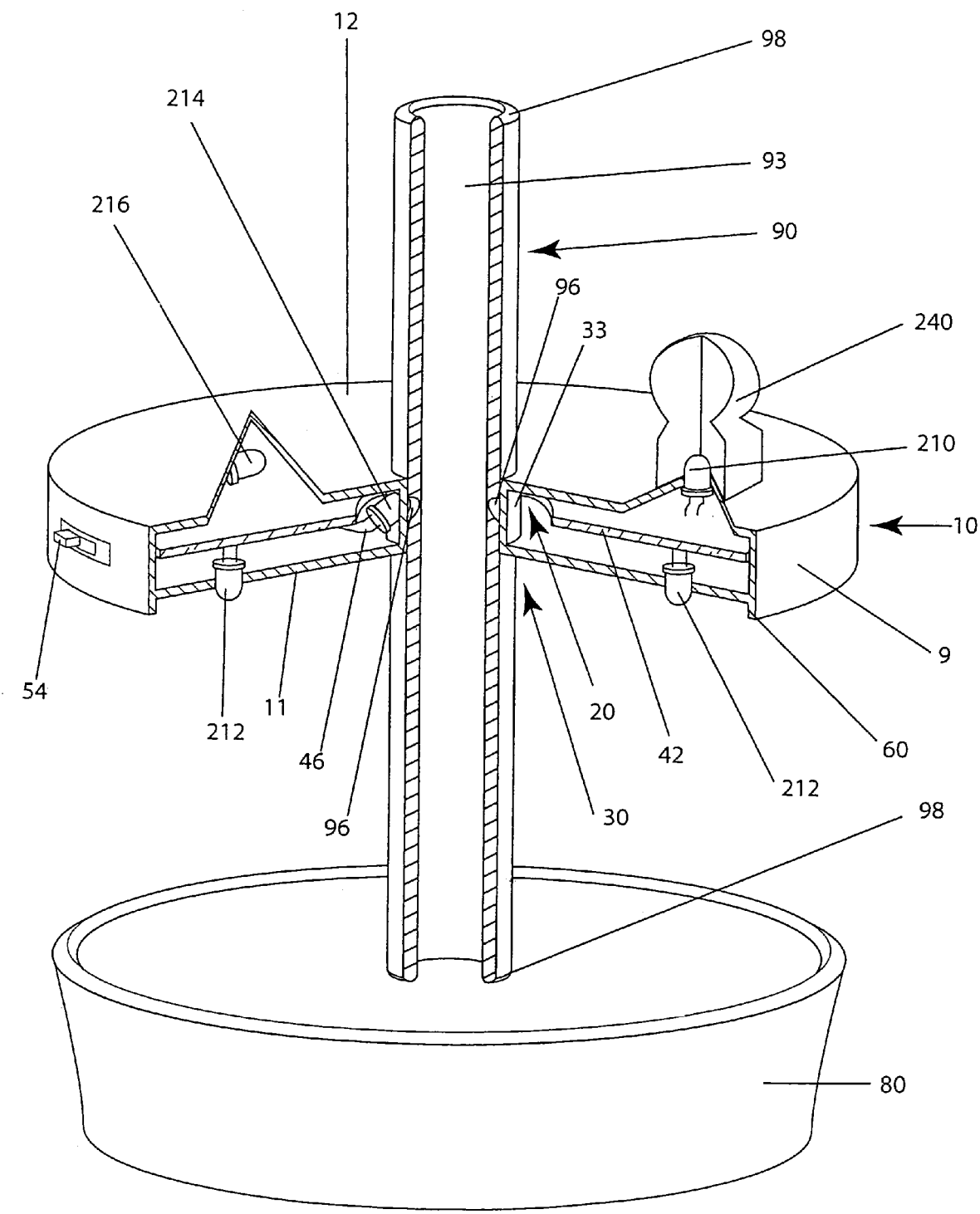
FIG. 1 is a perspective view of one embodiment of the invention, partially broken away, displaying a straw with a notch and a container lid with an on/off switch.

The following detailed description and accompanying drawings are provided for purposes of illustrating and describing presently preferred embodiments of the present invention and are not intended to limit the scope of the invention in anyway. It will be understood that various changes in the details, materials, arrangements of parts or operational conditions which have been herein described and illustrated in order to explain the nature of the invention may be made by those skilled in the art within the principles and the scope of the invention.

Referring to the drawings more particularly by reference numbers, FIGS. 1 through 9 show a special effects drinking container lid 10 and straw 90 of the present invention. The lid 10 in accordance with the preferred embodiment of the present invention resembles a standard drinking container lid with a bottom 11, top 12 and a sidewall 9. The lid 10 is generally comprised of a chamber 20, with a straw hole 30 and connecting means 60 for connecting the lid 10 to the drinking container 80.

In the preferred embodiment of this invention, the chamber 20 of the lid 10 is liquid tight since the container lid 10 could be placed in wet environments. Suitable sealing material is used to prevent liquid seepage into the chamber 20.

It should be kept in mind that the container lid 10 could be constructed to allow for the top 12 and bottom 11 portions of the container lid 10 to be opened and closed. By allowing the container lid 10 to be opened and closed, batteries 38 and scented cartridges could be replaced.

It should also be kept in mind that the height and circumference of the container lid 10 could be adjusted depending on the desired use and special effects one is trying to achieve.

It should be further kept in mind that the container lid 10 can be manufactured so that connecting means 60 can be attached to a plastic bottles of: soda, water, juice, sports drink and/or other drinking container 80.

In the preferred embodiment of the invention, the drinking container lid 10 has a circuit board 42 incorporated into the chamber 20 of the lid 10. The circuit board 42 in the preferred embodiment is connected to the special effects producing mechanisms to produce special effects in the lid 10, container 80, figure 240, object 450, and straw 90.

Depending on whether this invention will be used to entertain, advertise, and/or promote the sale of specific consumer goods and/or services. The following special effects can occur: (1) illumination of objects, figures, and designs (2) production of audio messages and sound, (3) production of distinctive smells, and (4) creation of movement in moveable figures or objects. Illumination can occur in the lid 10, container 80, straw 90, figure 240 and other objects. The following special effects mechanisms can be used: (1) lights 16, (2) sound generator 300, (3) smell generator 350, and (4) motor 400. Depending on the desired use of the product, the number of special effects will vary.

In the preferred embodiment of this invention the lights 16 are light-emitting diodes (L.E.D.). The LED lights 16 are used to illuminate the container 80, lid 10, figure 240, straw 90, and other objects if desired. The lights 16 for easy of reference will be identified as LED lights and even further identified by their location. For example: "figure LED light" 210 will be identified as such since that LED light is used to illuminate the figure 240; "drinking container LED light" 212 will be identified as such since the LED light is used to illuminate the drinking container 80; "straw LED light" 214 will be identified as such since that LED light is used to illuminate the straw 90; "container lid LED light" 216 will be identified as such since that LED light is used to illuminate the container lid 10.

Figure 5:
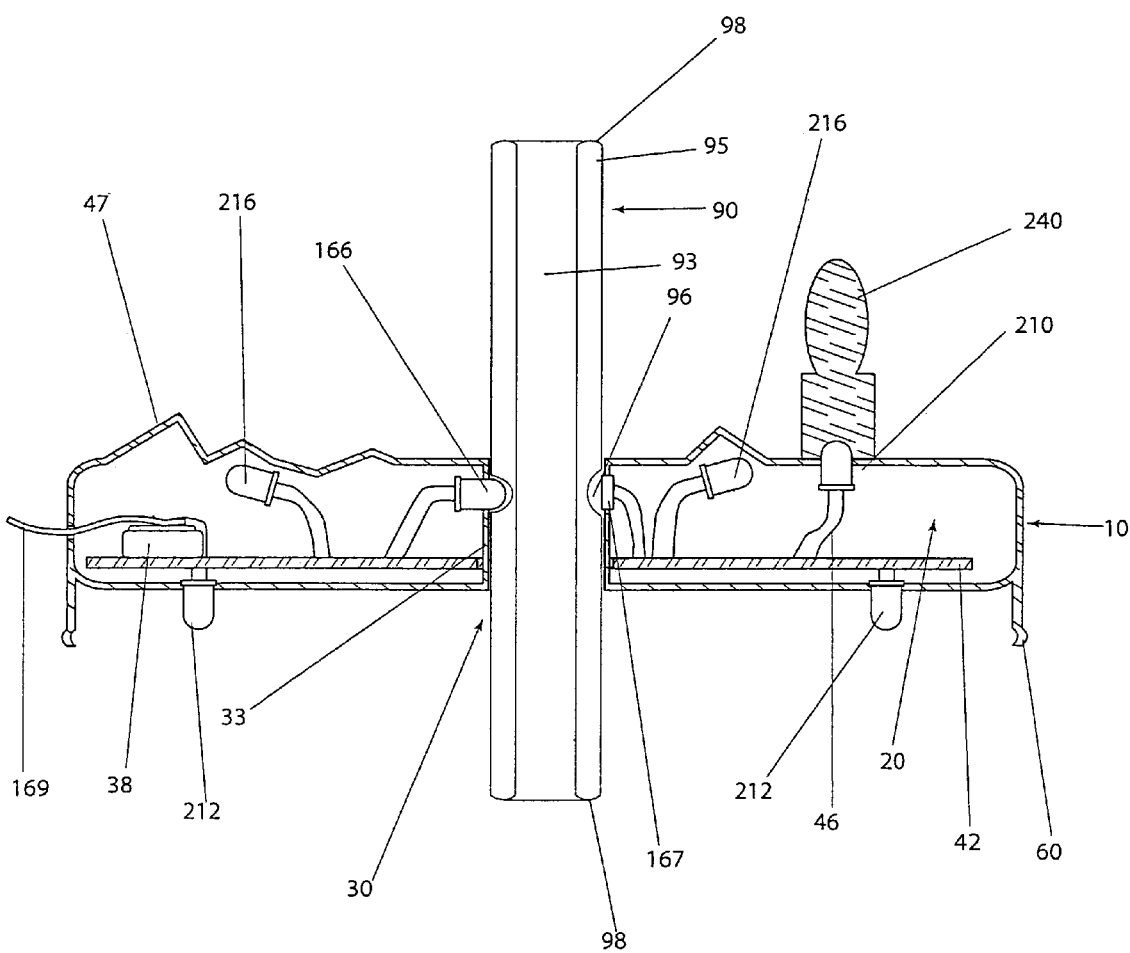
FIG. 5 is a vertical sectional view of one embodiment of the invention displaying a straw with a notch and an enlarged drinking container lid with a photo cell detector and an emitter light and a pull tab placed between the electrical wiring and the battery.
Figure 6:
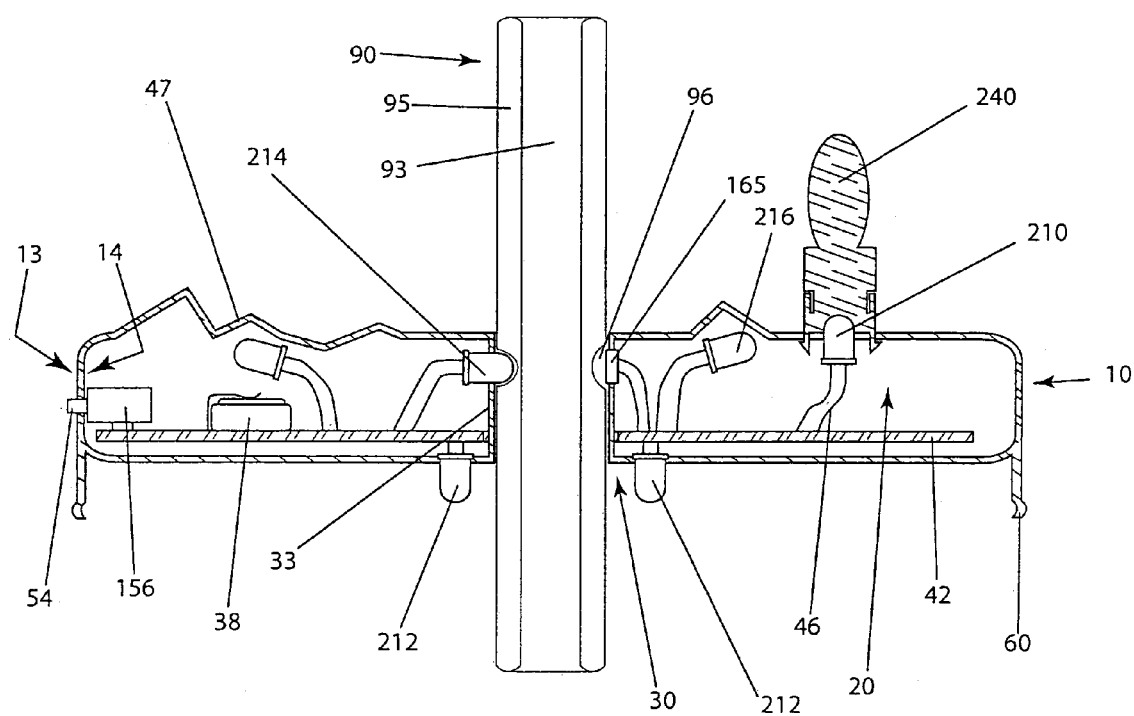
FIG. 6 is a vertical sectional view of one embodiment of the invention displaying a straw with a notch and an enlarged drinking container lid with an on/off switch and a photo cell, showing the internal connections and light sources.
Figure 11:
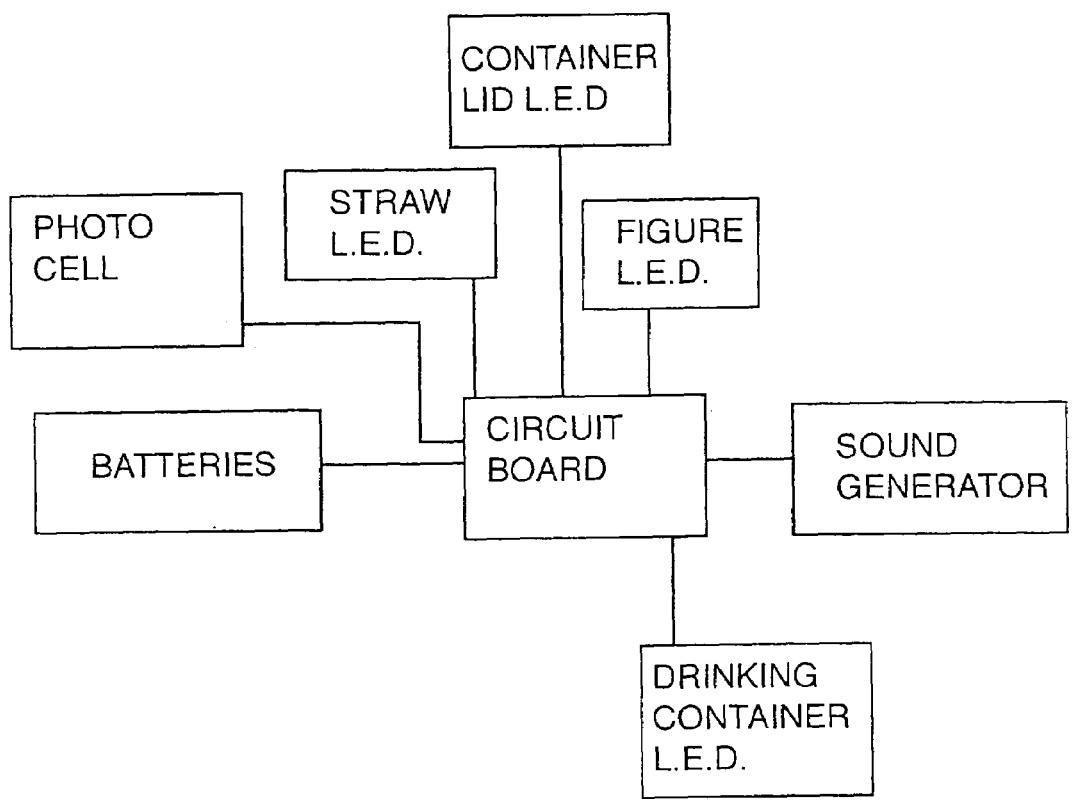
FIG. 11 is another embodiment displaying the circuit diagram of the control circuit board according to the present invention.
Figure 12:
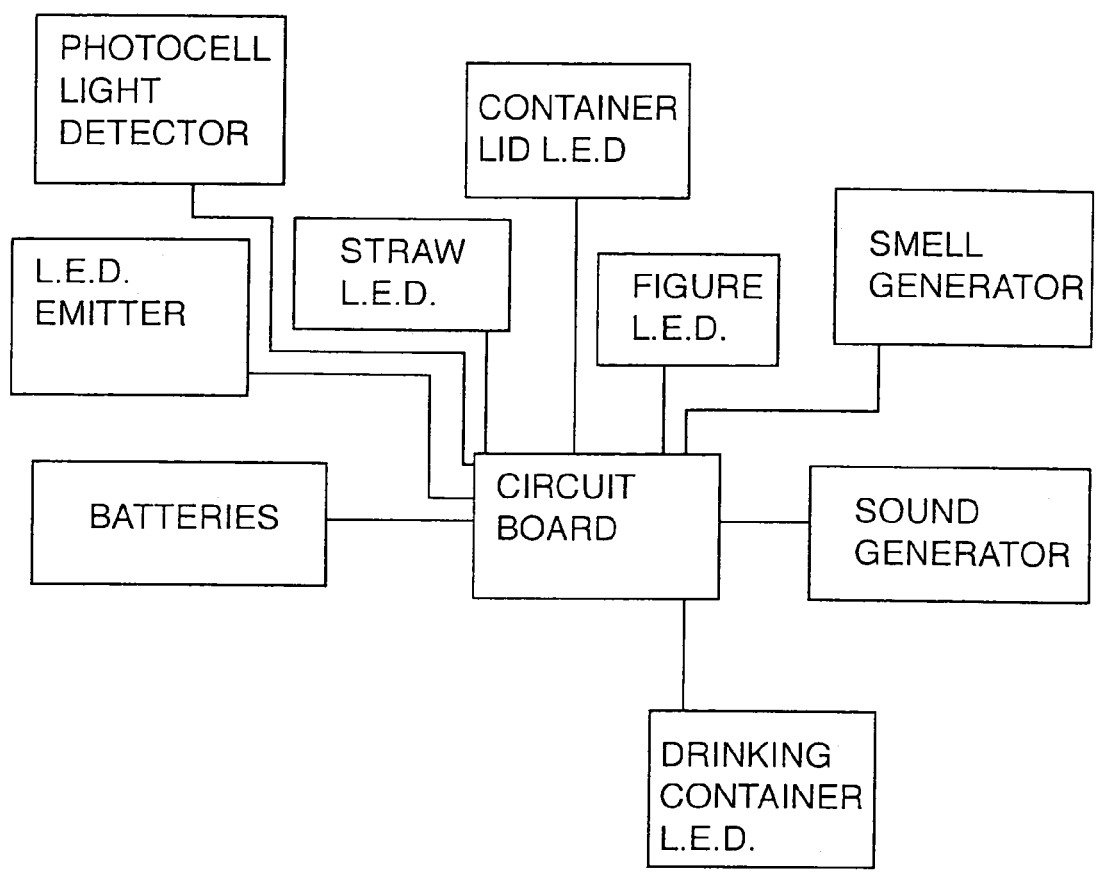
FIG. 12 is the preferred embodiment displaying the circuit diagram of the control circuit board according to the present invention.
Figure 13:
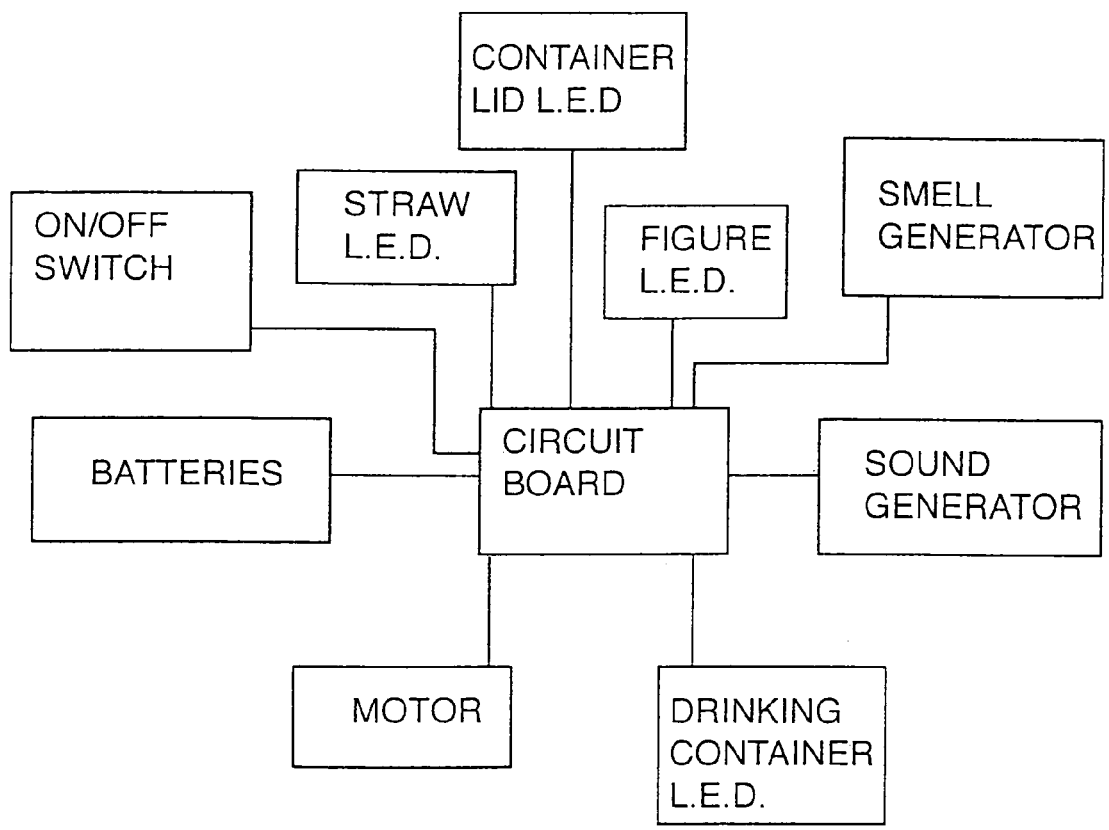
FIG. 13 is another embodiment displaying the circuit diagram of the control circuit board according to the present invention.
Figure 14:
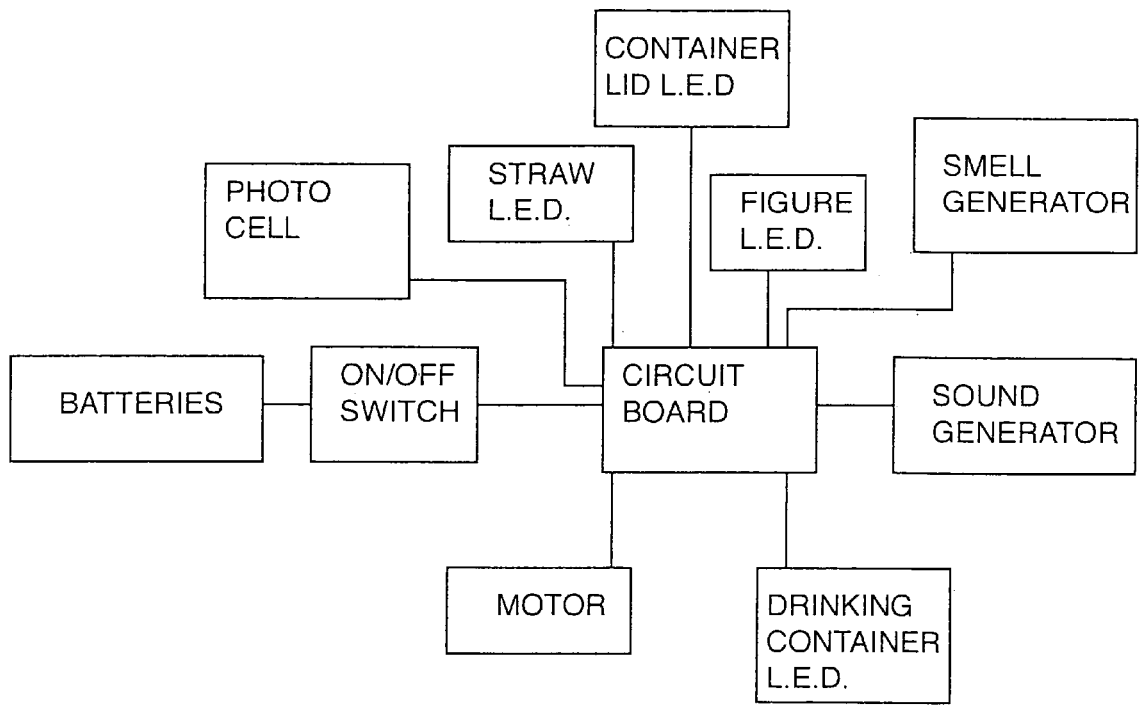
FIG. 14 is another embodiment displaying the circuit diagram of the control circuit board according to the present invention.
Figure 15:
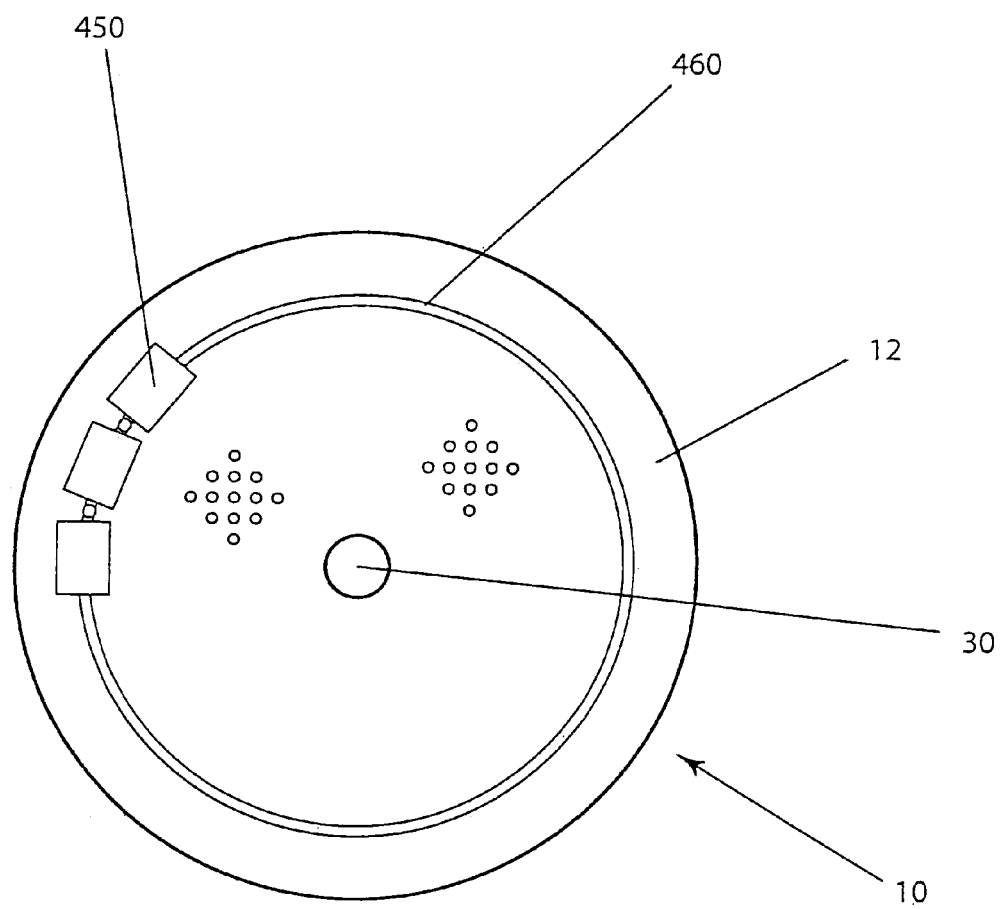
FIG. 15 is top view of an alternative embodiment displaying a drinking container lid with sound and smell holes and a designated path on which an object is put into motion on the container lid.

The circuit board 42 located in the chamber 20 of the lid 10, can be activated by: (1) a manual on/off switch 155 as seen in FIGS. 1, 2, 10 and 13; (2) photo cell detector 167 and emitter light 166 as seen in FIGS. 3, 4, 5, and 12; (3) photo cell 165 as seen in FIG. 11; (4) a manual on/off switch 155 at first then subsequently activated by the photo cell 165 as seen in FIGS. 6 and 14; (5) a manual on/off switch 155 at first then subsequently activated by the photo cell detector 167 and emitter light 166, not shown in figures; (6) magnet switch, not shown in the figures; and/or (7) sound activating switch, not shown in the figures. However, the preferred method of activation is through a photo cell detector 167 and emitter light 166 as seen in FIGS. 3, 4, 5 and 14.

Figure 2:
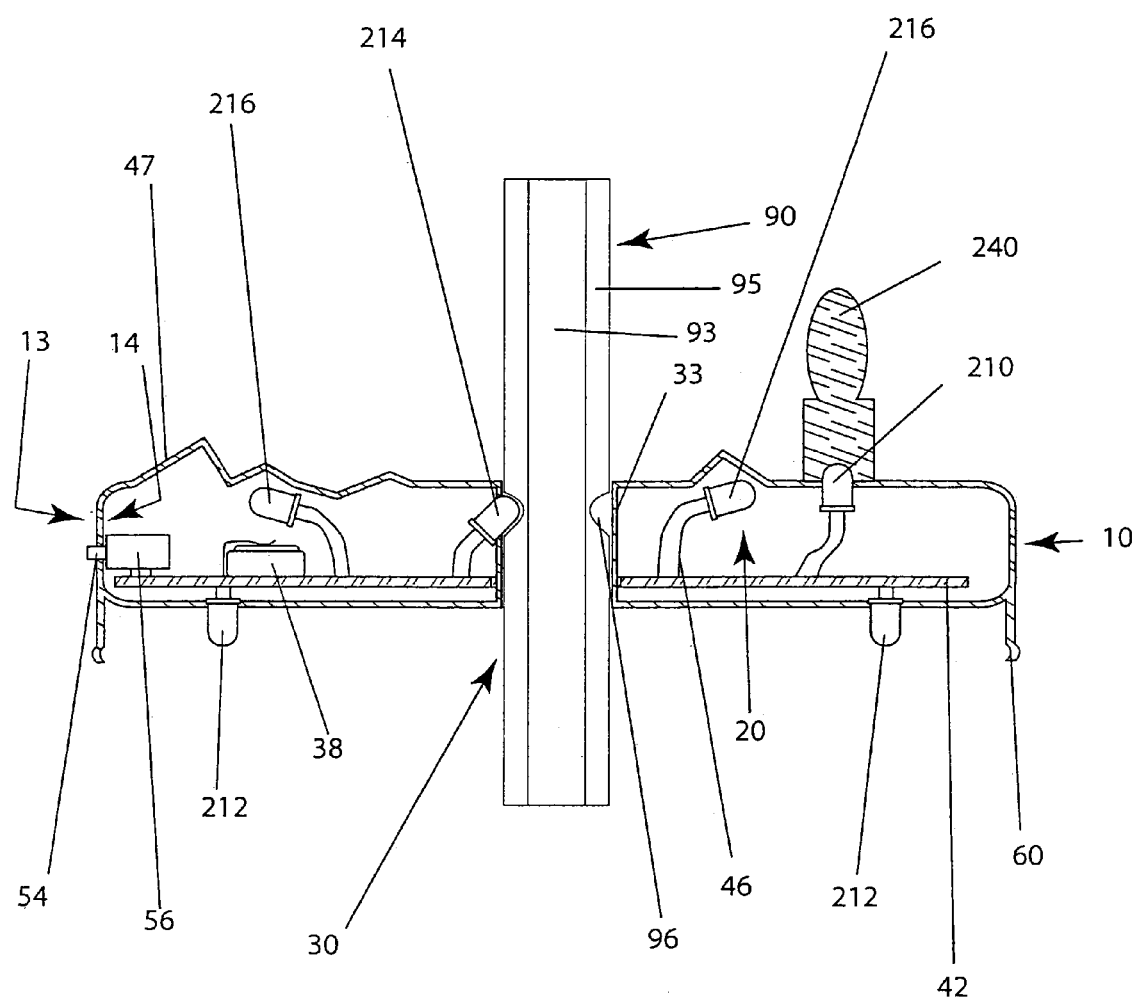
FIG. 2 is one embodiment of the invention displaying a vertical sectional view of a straw with a notch and an enlarged drinking container lid with on/off switch, showing the internal connections and light sources.

Incorporated into the chamber 20 of the lid 10, in one embodiment as seen in FIG. 2 is electrical wiring 46, circuit board 42, manual on/off switch 55, batteries 38, lights 16 (identified specifically as figure LED light 210, drinking container LED light 212, straw LED light 214, and container lid LED light 216), and a straw hole 30.

Figure 4:
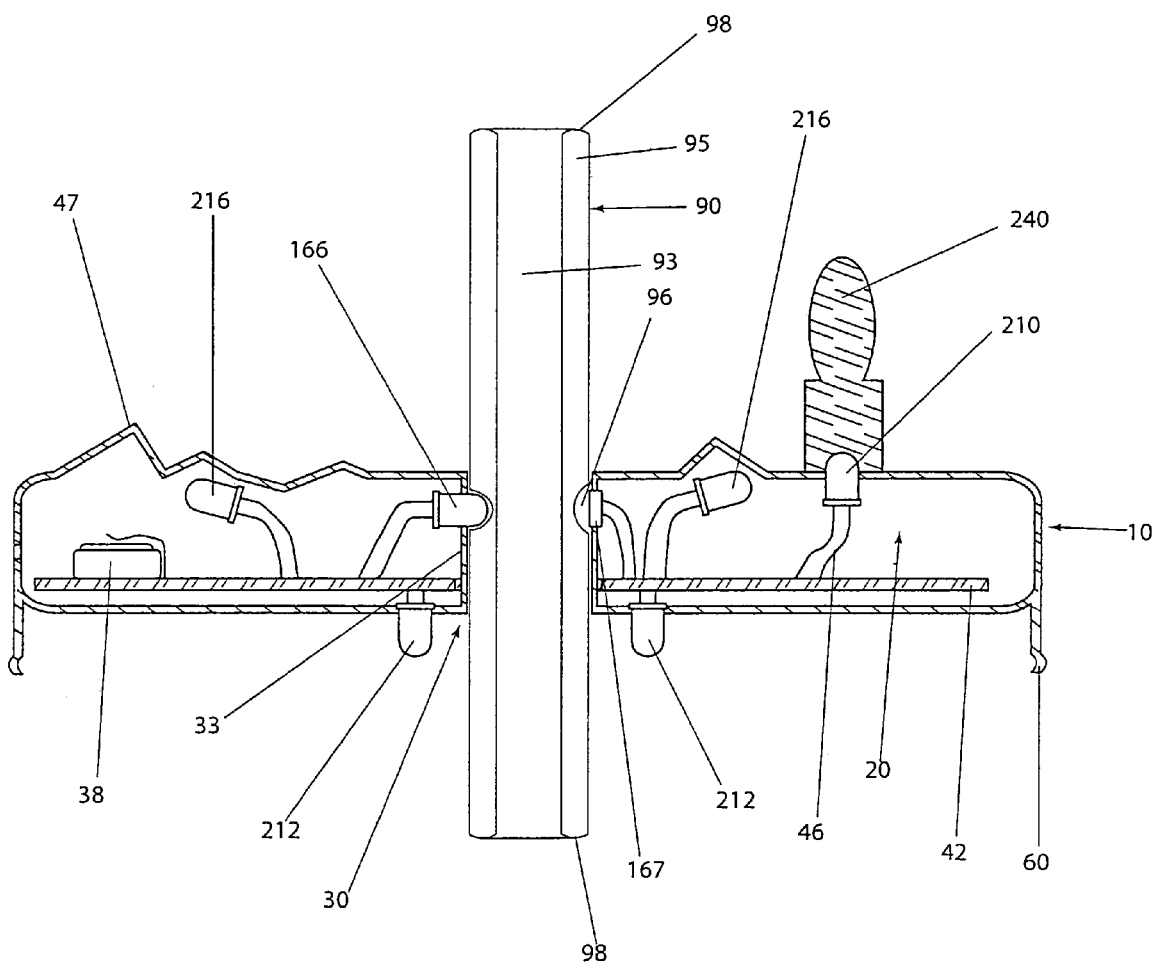
FIG. 4 is the preferred embodiment of the invention displaying a vertical sectional view of a straw with a notch and an enlarged drinking container lid with a photo cell detector and an emitter light, showing the internal connections and light sources.

Instead of the manual on/off switch 155 being incorporated into the chamber 20 of the lid 10, in the preferred embodiment of this invention as seen in FIG. 4, a photo cell detector 167 is positioned across from a light emitter 166, which are alternatively incorporated into the chamber. Additionally, in FIG. 4, a sound generator 300 and a smell generator 350 are also incorporated into the chamber 20, however the sound generator and smell generator are not shown.

In yet another alternative embodiment of this invention as seen in FIG. 6, a manual on/off switch 155 and a photo cell 165 are both incorporated into the chamber 20 of the lid 10. The sound generator 300 and smell generator 350 which are also incorporated into the chamber 20 are not shown in FIG. 6.

Electrical wiring 46 is used to connect the circuit board 42 to the: (1) lights 16 (identified specifically as figure LED light 210, drinking container LED light 212, straw LED light 214, and container lid LED light 216); (2) batteries 38; (3) sound generator 300; (4) smell generator 350; and (5) motor 400; as seen in FIGS. 2, 4, 5, 6, and 16.

It should be further understood that electrical wiring 46 is used to connect the activating mechanisms of this invention to the circuit board 42. The following activating mechanisms are used in various embodiments of the invention: (1) manual on/off switch 155; (2) photo cell 165; (3) a photo cell detector 167 and emitter light 166; (4) manual on/off switch 155 and a photo cell 165; (5) a manual on/off switch 155 at first then subsequently activated by the photo cell detector 167 and emitter light 166; (6) magnet switch; and/or (6) sound activated switch.

The electrical connection scheme and the use of a circuit board 42, allows the lights 16 to be illuminated in the desired order, pattern, or arrangement. It can be seen that the battery 38 and the circuit board 42 are positioned within the liquid tight interior of the chamber 20 of the lid 10. The electric circuit board 42 can be programmed to control the length of time that special effects can be on. Additionally, the electrical circuit board 42 can be programmed to activate the special effects at various times and have various intervals between special effects. Additionally, the circuit board can be programmed to allow multiple special effects to be activated simultaneously and/or have a special effect triggered at the conclusion of one of the other special effects.

In an alternative embodiment of this invention as seen in FIGS. 1 and 2, a manual on/off switch 155, which includes a switch body 156, which is fastened along the interior sidewall surface 14 of the container lid 10. The switch body 156 is fastened to the interior sidewall surface 14 in a fashion so as to prevent liquid from passing into the chamber 20 of the lid. It can be seen that the toggle 54 of the manual on/off switch 155 extends outwardly beyond the exterior sidewall surface 13 of the container lid 10. This enhances the ability to easily manipulate the manual on/off switch 155 as needed.

In operation, the manual on/off switch 155 having a toggle 54 between on and off will send a small electrical pulse to the circuit board 42 when the toggle 54 is moved to the on position. That electrical signal that is received by the circuit board 42 will trigger the software that turns the special effects on and off. This embodiment of the invention can be seen in FIGS. 1 and 2.

In the preferred embodiment of this invention, a photo cell 165 can either be used by itself or in conjunction with a light emitter 166 to sense a change in luminosity. If a photo cell is used with a light emitter 166, a more accurate method of activating the special effects drink container lid can be achieved. Please note, that if a photo cell is used with a light emitter, the photo cell will be referred to as a detector. Please also note that in order to utilize a photo cell, the straw must be made of a transparent or semi-transparent material.

In the preferred embodiment of this invention, a photo cell 165, which includes a photo cell body 164 having a small plate which is fastened along the circular wall 33 of the straw hole 30 of the container lid 10. The small plate and body 164 is fastened to the surface of the circular wall 33 of the straw hole 30 in a fashion so as to prevent liquid from passing into the chamber 20 of the lid. In the preferred embodiment, the photo cell 166 is a detector 167 which is positioned across from an emitter 166. The emitter 166 is a light 16 that could emit either an invisible beam, an infra red light, an ultra violate light, and/or an LED light. For easy of reference the emitter 166 shall be referred to as an emitter light 166. The emitter light 166 can be inserted through the circular wall 33 of the straw hole 30 of the container lid 10 thereby position the emitter light 166 inside the straw hole 30 of the lid 10. When the emitter light 166 is turned on by one of the methods of activation, the emitter produces a beam of light, that light travels on a path through the transparent or semi transparent straw 90 material until it is received by the detector 167 of the photo cell 165. When liquid flows through the straw channel 93 of the straw 90 a break occurs in the path in which the light travels from the emitter 166 to the detector 167, thereby generating an electrical pulse in the photo cell 165. That electrical pulse is then sent to the circuit board 42 which will trigger the software to turn on the special effects. In the preferred embodiment the straw is made out of a transparent material, thereby allowing the light to travel with ease from the emitter light 166 to the detector 167. This preferred embodiment of the invention is being utilized in FIGS. 3 and 4. FIG.

3 shows the photo cell detector 167 and straw LED light 214 however, the emitter light 166 can not be shown from that particular angle. FIG. 4 shows the photo cell detector 167 and emitter light 166, but the straw LED light 214 can not be seen from this particular angle. Also note, that the straw LED light 214 can be used as an emitter light 166.

It should also be kept in mind that one or more emitters 166 and detectors 167 could be positioned around surface of the circular wall 33 of the straw hole 30 to more accurately sense a break in the path light travels when liquid flows through the straw channel 93 of the straw 90.

Figure 7:
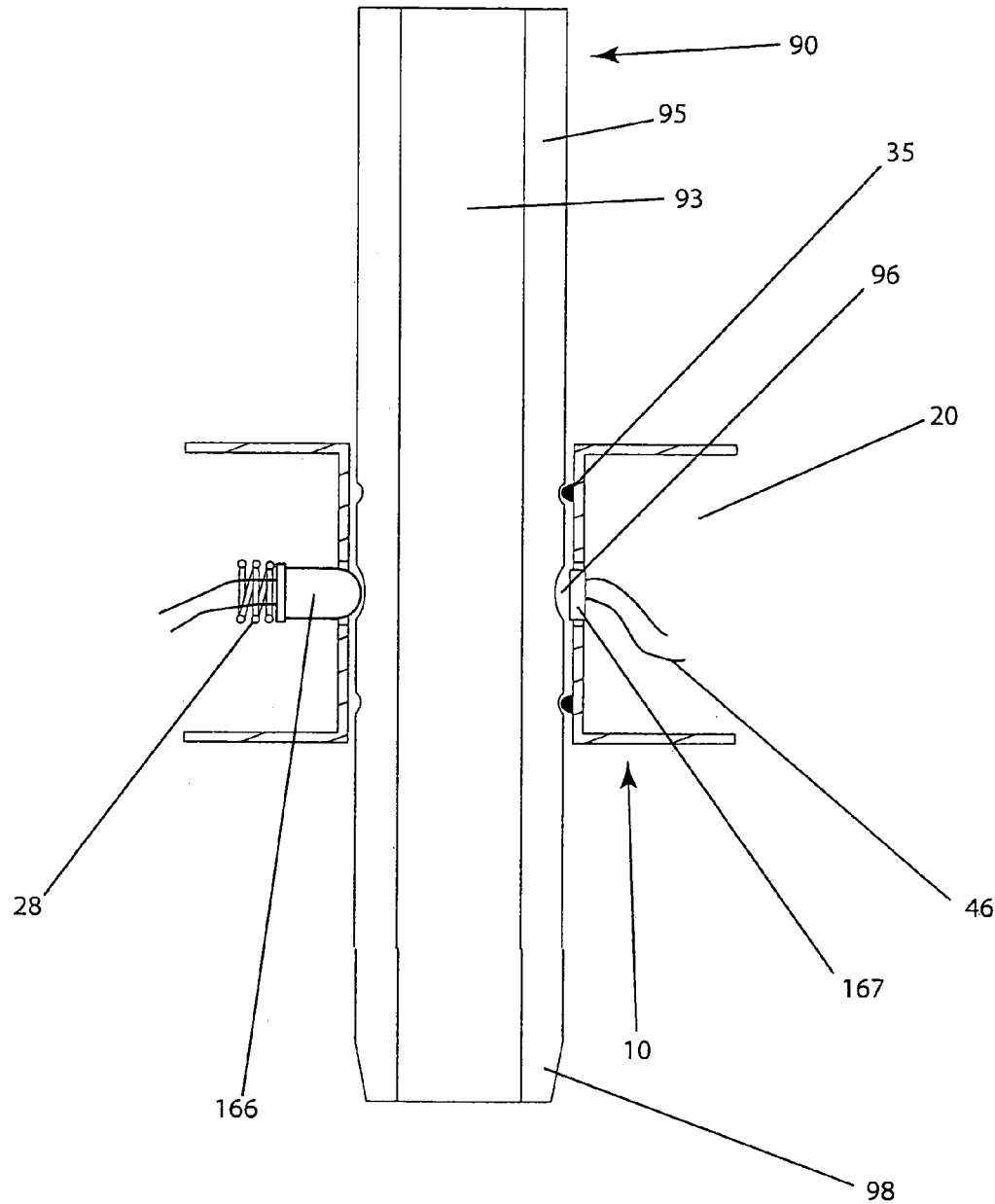
FIG. 7 is a vertical sectional view of part of the container lid with a photo cell and a spring emitter light and a straw with notches.

FIG. 7 shows an alternative embodiment, where the emitter light 166 is equipped with a spring 28 that allows the straw 90 with the notch 96 to easily slide in and out of the straw hole 30 of the container lid 10. The spring 28 helps elevate the pressure that the straw 90 placed on the emitter light 166 when the straw 90 is inserted into the straw hole 30. When the straw 90 is slid into the straw hole 30, the emitter light 166 that protrude into the straw hole 30 is retracted when the light comes into direct contact with the straw 90. When the notch 96 of the straw 90 is positioned adjacent to the emitter light 166 with the spring 28, the emitter light 166 is extended into the notch 96 of the straw 90, thereby temporarily securing the straw 90 into place. By equipping the emitter light 166 with a spring 28, the emitter light 166 and detector 167 can be positioned closer together thereby creating a shorter path in which the light (invisible beam, infer red light, ultra violate light, and/or an LED light) must travel from the emitter 166 to the detector 167 to activate the photo cell 165.

FIG. 7 also shows in an alternative embodiment stoppers 35 positioned in the circular wall 33 of the straw hole 30. The stoppers 35 should be constructed with means for temporarily securing the straw 90 into place with the container lid 10 thereby allowing the emitter 166 to be positioned across from the detector 167. The stopper 35 can be comprised of a rubber material.

In an alternative embodiment not shown, the emitter light 166 and detector 167 are both equip with a spring 28, to yet further shorter path in which the light (invisible beam, infer red light, ultra violate light, and/or an LED light) travel from the emitter 166 to the detector 167. In order to make this embodiment water tight, the detector 167 should be placed at the tip of a housing that protrudes into the straw hole 30. The housing should be constructed of a plastic material. By utilizing the housing, water cannot seep into the chamber 20 when the spring 28 extends the detector 167 into the straw hole 30. When liquid flows through the straw channel 93 of the straw 90 a break occurs in the path in which the light travels from the emitter 166 to the detector 167, thereby generating an electrical pulse in the photo cell 165. That electrical pulse is then sent to the circuit board 42 which will trigger the software to turn on the special effects.

In an alternative embodiment of this invention, the photo cell 165 having a small plate is positioned along the circular wall 33 of the straw hole 30 so it can sense sudden changes in luminosity of the straw 90. A sudden change in the luminosity of the straw will occur when liquid flows through the straw channel 93. When a sudden change in the luminosity occurs an electrical pulse is sent from the photo cell to the circuit board 42 which in turn triggers the software that turns the special effects on. In order for the photo cell 165 to operate properly the straw 90 should be comprised of a body 92 molded from a transparent or semi transparent material.

In an alternative embodiment not shown, the photo cell 165 is equip with a spring 28, to allow the small plate to be positioned against the straw wall 95 so it can more accurately sense sudden changes in luminosity of the straw 90. A sudden change in the luminosity of the straw will occur when liquid flows through the straw channel 93. In order to make this embodiment water tight, the photo cell 165 should be placed at the tip of a housing that protrudes into the straw hole 30. The housing should be constructed of a plastic material. By utilizing the housing, water cannot seep into the chamber 20 when the spring 28 extends the photo cell 165 into the straw hole 30.

In the various embodiment of this invention, suitable sealing materials should be used to prevent liquid seepage into the chamber 20 of the lid 10 when emitter lights 166, detectors 167, photo cells 165, and/or straw LED lights 214 are position so that they protrude from the circular wall 33 of the straw hole 30 into the straw hole 30.

To prevent the emitter light 166 from being on while shipping, a pull tab 169 should be utilized. The pull tab 169 should be positioned between the battery 38 and the electrical wiring 46 as seen in FIG. 5, so that when the pull tab 169 is removed the electrical wiring is then connected to the battery. Once the pull tab 169 is removed the battery 38 and electrical wiring 46 are connected and the emitter light 166 is turned on and will remain on until the battery is dead. The pull tab 169 can be constructed so that it extends from the chamber 20 outwardly beyond the exterior sidewall surface 13 of the container lid 10. In an alternative embodiment not shown, the top of the lid 12 could be removed to get inside the chamber 20 of the lid 10 to remove the pull tab 169 and activate the emitter light 166.

In another alternative embodiment of this invention can be seen using a manual on/off switch 155 and also a photo cell 165. In operation, when the manual on/off switch 155 having a toggle 54 is moved to the on position a small electrical pulse is sent to turn on the photo cell 165. Since the photo cell 165 has been turned on, the photo cell will send an electrical pulse to the circuit board 42 when liquid flows through the straw 90, thereby triggering the software that in turn triggers the special effects. By utilizing this method of activation for the photo cell 165, the batteries 38 for this invention can be preserved. Just as explained above, in order for the photo cell 165 to operate properly the straw 90 should be comprised of a body 92 molded from a transparent or semi transparent material. FIG. 6 shows this alternative embodiment of the invention.

In an alternative embodiment not shown, the special effects mechanisms can be activated by a magnet switch that can be positioned around the straw hole inside a container lid, have a corresponding magnet positioned adjacent to the straw passageway. Said corresponding magnet has an arm that is permanently connected to the magnet. The arm of the corresponding magnet extends outwardly beyond the interior side wall of the lid and into the passageway, where the liquid travels. When liquid is sucked up the straw, the arm and attached magnet are moved in an upward direction from a point of rest. The upward movement in the arm and attached magnet causes a corresponding magnet attached to the switch to also be moved upward thereby activating the special effects mechanisms.

In an alternative embodiment not shown the special effects mechanisms can be triggered by a sound activated switch that detects a change in the decibel level.

Although the present invention utilizes the above methods of activation (i.e. manual on/off switch 155; photo cell 165; photo cell detector 167 and emitter light 166; manual on/off switch 155 and a photo cell 165; a manual on/off switch 155, a photo cell detector 167 and an emitter light 166; a magnet switch; and/or sound activated switch), it should be kept in mind that a variety of others methods of activation and switches could be employed. For example, the manual on/off switch 155 could be replaced with a knob and rheostat, which would allow the intensity of the special effects (i.e. illumination) to be varied or alter the pattern in which the even special effects are performed (i.e. altering the light sequencing pattern).

To achieve illumination in the straw 90 for the purpose of this invention, a light 16 must be placed in and/or around the straw hole 30 of the container lid 10 and a straw 90 must be inserted into the container lid 10. When any activating mechanism is triggered an electrical pulse is sent to the circuit board 42, which in turn sends an electrical pulse to the straw LED light 214 to illuminate the straw 90.

This invention in alternative embodiments allows a straw 90 and/or straws to be permanently or temporarily held in place by lights 16 and/or container lid 10.

The straw 90 should be constructed with enough length so that the bottom of the straw is able to extend to the bottom of the container 80 and simultaneously have the top of the straw extend beyond the lid 10 of the container. The straw 90 is generally comprised of a body 92 molded from a glass or plastic material. The straw 90 should be specially constructed with: (1) a thick straw wall 95 as seen in FIGS. 1–9; (2) a notch 96 as seen in FIGS. 1–8; and/or (3) a recess 97 as seen in FIG. 9. By using a specially constructed straw 90, a brighter illumination is attained when compared to an ordinary straw. The straw wall 95 shall be thick enough to allow a notch 96 or recess 97 to be placed on the straw 90. By creating a straw 90 with a thick straw wall 95, a notch 96, and/or a recess 97, illumination is improved in the straw 90 when lights 16 are positioned around the straw 90. An even brighter illumination is achieved when lights 16 are positioned in the straw wall 95 and/or against the straw 90.

It can be seen in FIGS. 1 and 2 that a light 16 and/or lights (straw LED light 214) protrude into the straw hole 30 of the lid 10. The straw LED light 214 can be inserted through the circular wall 33 of the straw hole 30 of the container lid 10. In the preferred embodiment of this invention, the straw LED light 214 is positioned inside the straw hole 30 of the lid 10 to enhance the illumination of the straw 90. In an alternative embodiment not shown, the straw LED light 214 is positioned along the circular wall 33 of the straw hole 30.

In the preferred embodiments of this invention the straw LED light 214 uses suitable sealing material is used so as to prevent liquid intrusion through the opening in the circular wall 33. Since the container lid 10 can be used in wet environments it is important to maintain the liquid-tight character of the electronics inside the chamber 20 of the lid 10.

FIG. 1 shows that a straw 90 has been inserted into the straw hole 30 of the lid 10. When the straw 90 is slid into the straw hole 30 of the lid 10, the straw LED light 214 that protrude from the straw hole 30 of the lid 10 shall cause the straw 90 with the notch 96 (FIG. 1) or recess 97 (FIG. 9) to be secured temporarily in place when the notch and/or recess of the straw 90 comes into contact with the straw LED light 214.

By constructing a straw 90 with two recesses 97 as seen in FIG. 9, the lights 16 (straw LED lights 214) can be positioned inside the straw wall 95 and angled upward and downward to internally and externally illuminate that portion of the straw 90. In one embodiment of the invention the straw 90 with the recesses 97 can be permanently connected to the container lid 10. To attain the best overall illumination in the straw 90 one straw LED light 214 is angled upward and another straw LED light 214 is angled downward. The illumination in the straw 90 can be further enhanced, by positing the recess and/or recesses 97 inside the straw wall 95 as close to parallel with the straw passageway 98 as possible. In another embodiment of the invention not shown, a straw 90 with two recesses 97 and two lights 16 can be positioned in the recesses of the straw wall 95 and lights can be angled in opposing directions in the straw wall, thereby allowing the straw 90 to be come fixed into place with the container lid 10 by the placement of lights 16 inside the recesses 97 of the straw wall 95.

Figure 8:
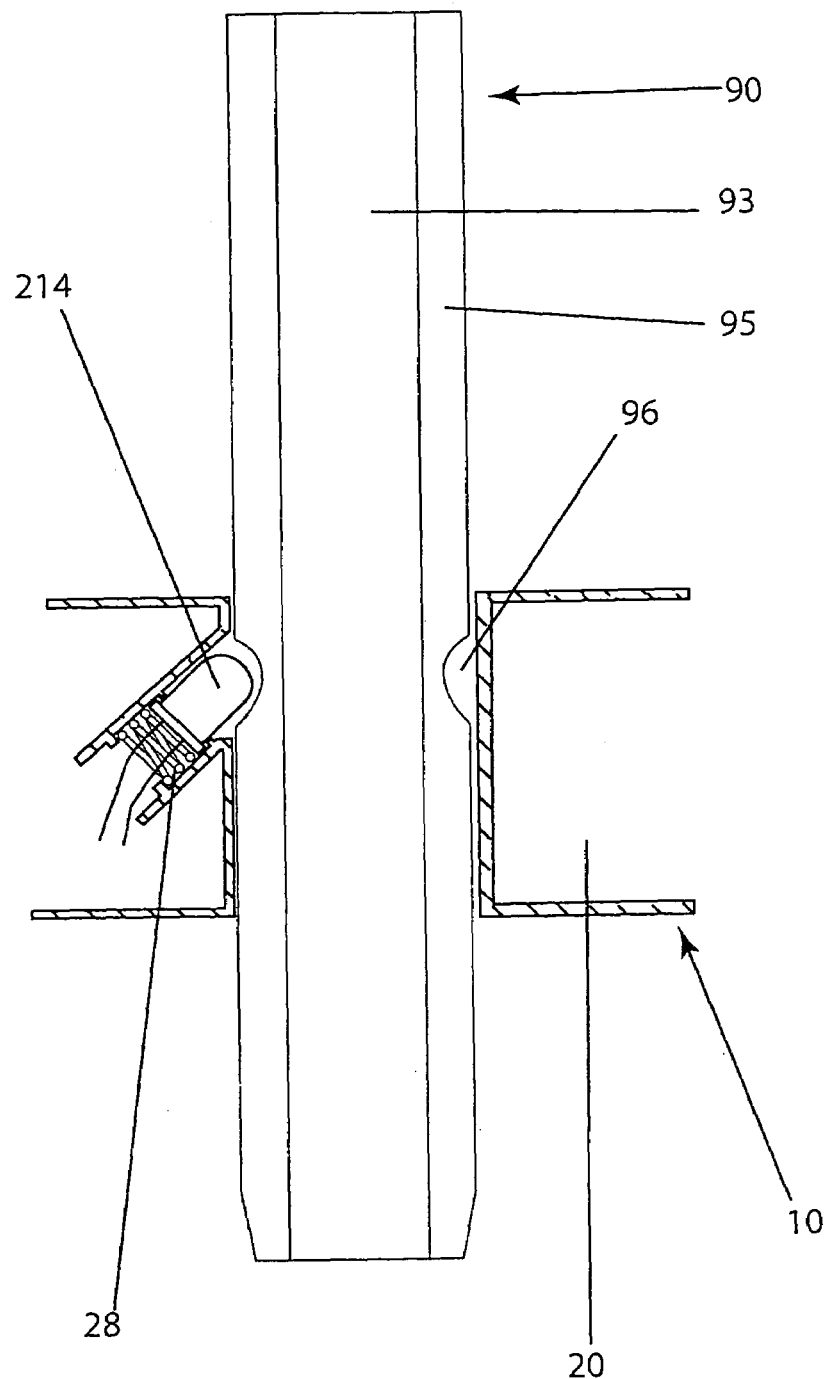
FIG. 8 is a vertical sectional view of part of the container lid with a spring light and a straw with a notch.
Figure 9:
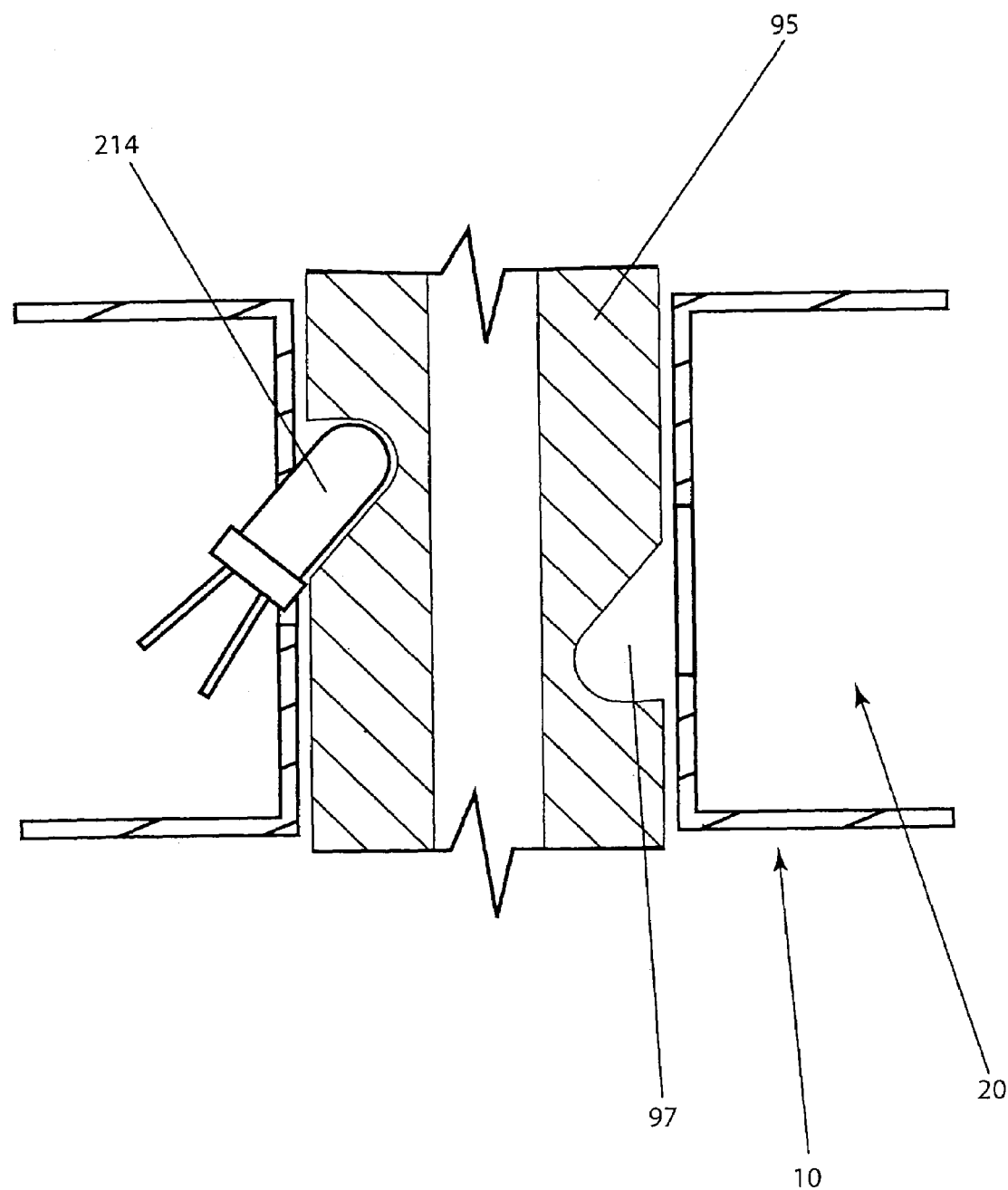
FIG. 9 is an enlarged vertical sectional view of the container lid and straw with two recesses positioned inside the straw wall, inside one recess of the straw is a light angled upward to illuminate the that portion of the straw.
Figure 10:
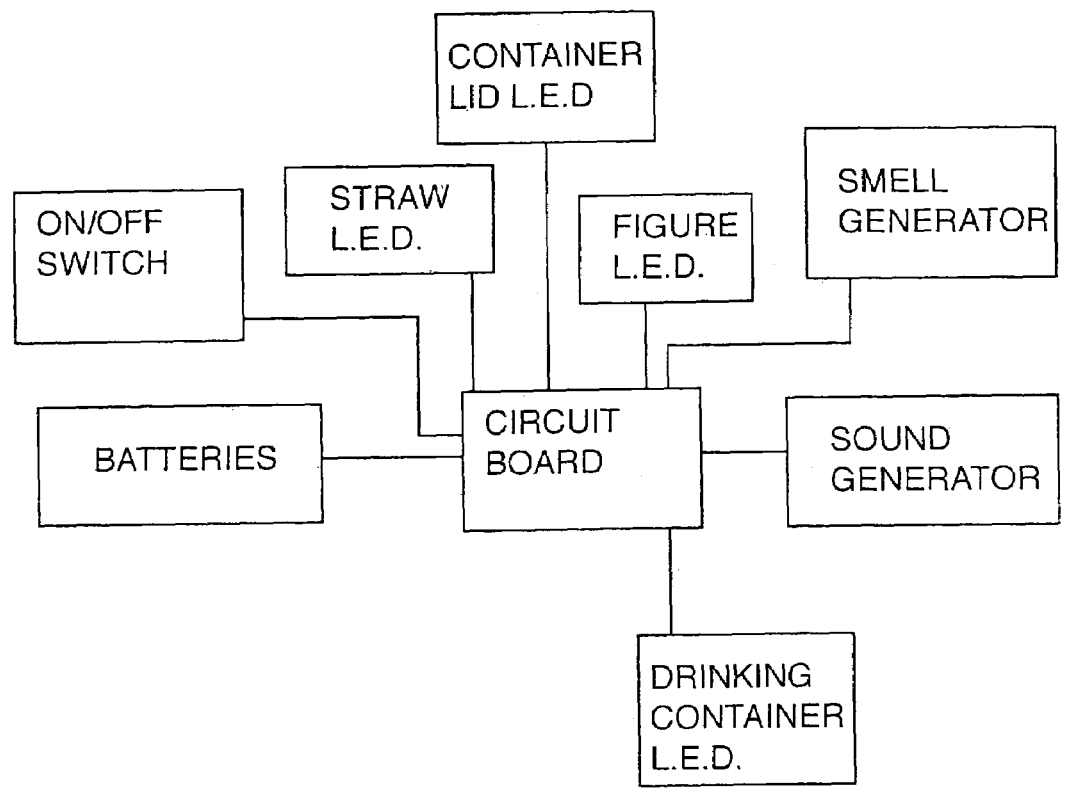
FIG. 10 is one embodiment of the invention displaying the circuit diagram of the control circuit board.

FIG. 8 shows an alternative embodiment, where the straw LED light 214 is equipped with a spring 28 that allows the straw 90 with the notch 96 to easily slide in and out of the straw hole 30 of the container lid 10. The spring 28 helps elevate the pressure that the straw 90 placed on the straw LED light 214 when the straw 90 is inserted into the straw hole 30. When the straw 90 is slid into the straw hole 30, the straw LED light 214 that protrude into the straw hole 30 is retracted when the light 16 comes into direct contact with the straw 90. When the notch 96 of the straw 90 is positioned adjacent to the straw LED light 214 with the spring 28, the straw LED light 214 is extended into the notch 96 of the straw 90, thereby temporarily securing the straw 90 into place. By equipping the straw LED light 214 with a spring 28, illumination is further enhanced since the straw LED light 214 can be positioned against the straw wall 95 in the notch 96 of the straw 90.

In the preferred embodiment of this invention, to achieve optimum illumination in the straw 90 with the notch 96; the notch 96 of the straw 90 should be positioned at the point where the straw LED light 214 protrudes from the straw hole 30 of the lid 10. By positioning the straw LED light 214 against the straw wall 95 and in the notch 96 of the straw 90, the optimum internal and external illumination in the straw 90 is achieved. In the preferred embodiment of this invention the straw 90 has a straw wall 95 that is 3 millimeters thick and a notch that is 1.5 millimeters deep.

In an alternative embodiment of this invention, to achieve optimum illumination in the straw 90 with the recess 97; the recess 97 of the straw 90 should be placed at the point where the straw LED light 214 protrudes from the straw hole 30 of the lid 10. The straw LED light 214 should be positioned against the straw wall 95 and in the recess 97 of the straw 90 and positioned as close to parallel as possible to the straw 90 to achieve the optimum illuminating angle to internally and externally illumination of the straw 90.

By utilizing an alternative embodiment described below but not depicted in the drawing, a straw 90 with lights positioned in the recesses 97 of the straw wall can be easily removed. However, the straw 90 should be constructed with either (a) one recess, or (b) two or more recesses all angled either upward or downward, to facilitate the easy removal of the straw from the container lid when lights 16 are positioned in the recess of the straw wall. Additionally, the straw LED light 214 could be equipped with a spring 28 to further facilitate the removal of the straw. To retract the spring straw LED light 214 when it is positioned in the recess 97 you can either push or pull the straw 90 in the direction that enables retraction of the spring 28. By utilizing that embodiment a straw 90 with a recess 97 can be easily removed from the lid 10.

Figure 3:
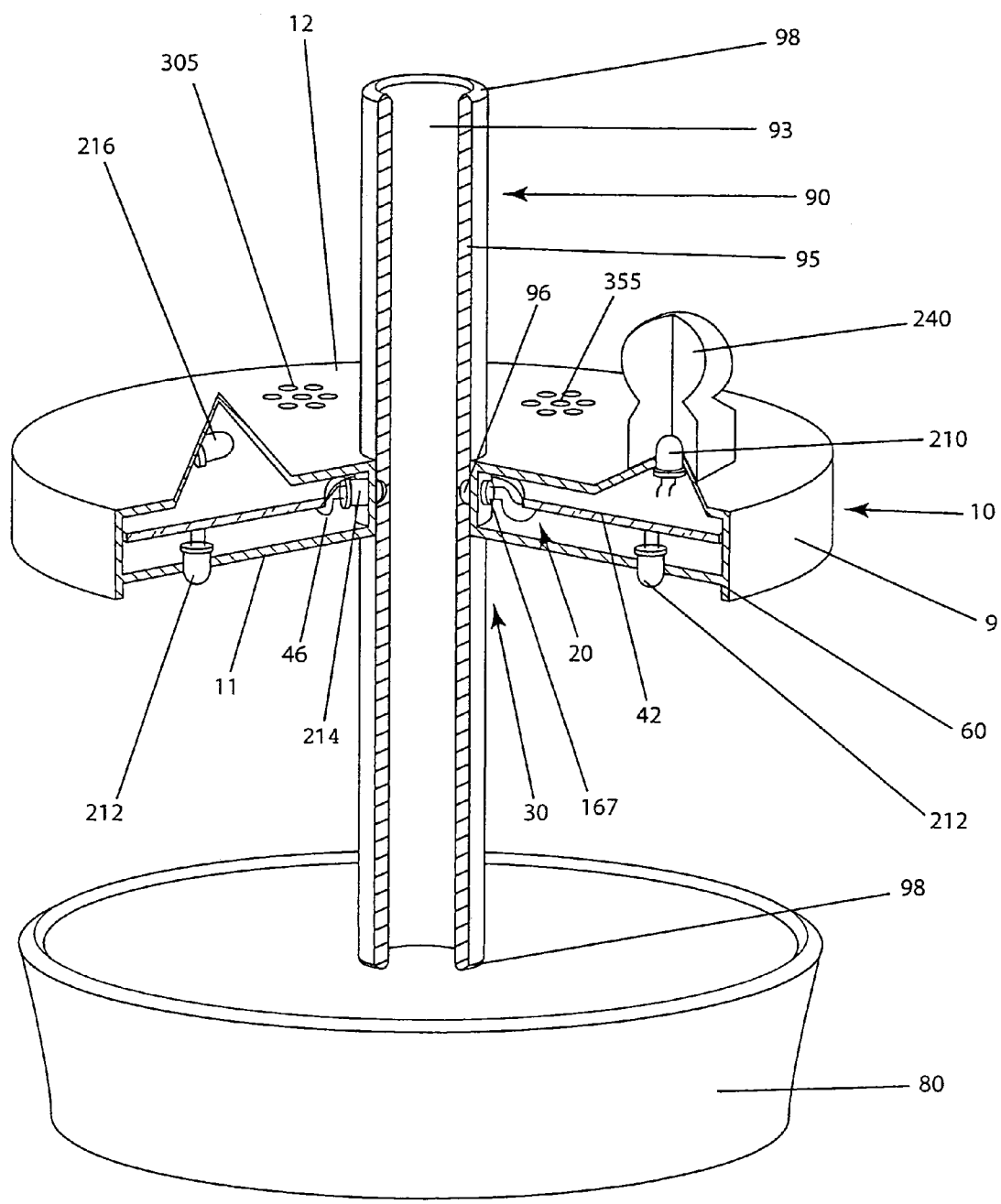
FIG. 3 is a perspective view of the preferred embodiment of the invention, partially broken away, displaying a straw with a notch and a container lid with a photo cell detector and an emitter light.

FIGS. 3 and 4 shows a straw 90 with rounded ends 98. By utilizing rounded ends 98 at the top and bottom of the straw 90, better internal light refraction can be achieved in an illuminated straw 90.

FIGS. 1–8 shows a straw 90 with a notch 96. FIG. 9 shows a straw 90 with a recess 97. By utilizing a straw 90 with a notch 96 or a recess 97, better internal light refraction can be obtained in an illuminated straw.

It should be kept in mind that numerous notches 96 and/or recesses 97 can be placed into the straw wall 95 of the straw 90. It should also be kept in mind that the straw 90 does not require a notch 96 or a recess 97 to be illuminated. All that the straw 90 requires is that it be positioned around, adjacent, or against a straw LED light 214. Although, FIGS. 1–8 shows that the straw 90 can be constructed with a notch 96 and with rounded ends 98 as seen in FIGS. 1 and 3, FIG. 9 shows that the straw 90 can be modified to have a recess 97. As such, it should be kept in mind that a variety of other modifications of the straw 90 could be employed to internally and externally illuminate the straw 90.

Depending on the desired use and illuminating effect desired, it should be kept in mind that the thickness of the straw wall 95, and the depth of the notch 96 or recess 97 of the straw 90 can vary. Since the best illumination of the straw is achieved when a notch and/or a recess is placed in the straw wall. In order to fully capture the illuminating effect from a notch and/or recess in the straw wall, it is recommended that the straw wall be a minimum of 2 millimeters thick and the notch and/or recess be a minimum of 1.3 millimeters deep. Please keep in mind that the minimum thickness and depth can be exceeded, however the illuminating effect will not be as great.

To achieve illumination in a figure 240 that can be removably connected to the container lid 10 for the purpose of this invention; a light and/or lights 16 (figure LED light 210) must be placed in, around, and/or against the figure 240. If figure 240 is attached to the container lid 10 then the internal illumination of the figure can be further enhanced. When any activating mechanism (i.e. manual on/off switch 155; photo cell 165; a photo cell detector 166 and a emitter light 167; manual on/off switch 155 and a photo cell 165; manual on/off switch 155, a photo cell detector 167 and an emitter light 166; magnet switch; and/or sound activated switch) is triggered, an electrical pulse is sent to the circuit board 42, which in turn sends an electrical pulse to the figure LED light 210 to illuminate the figure 240.

Figure 19:
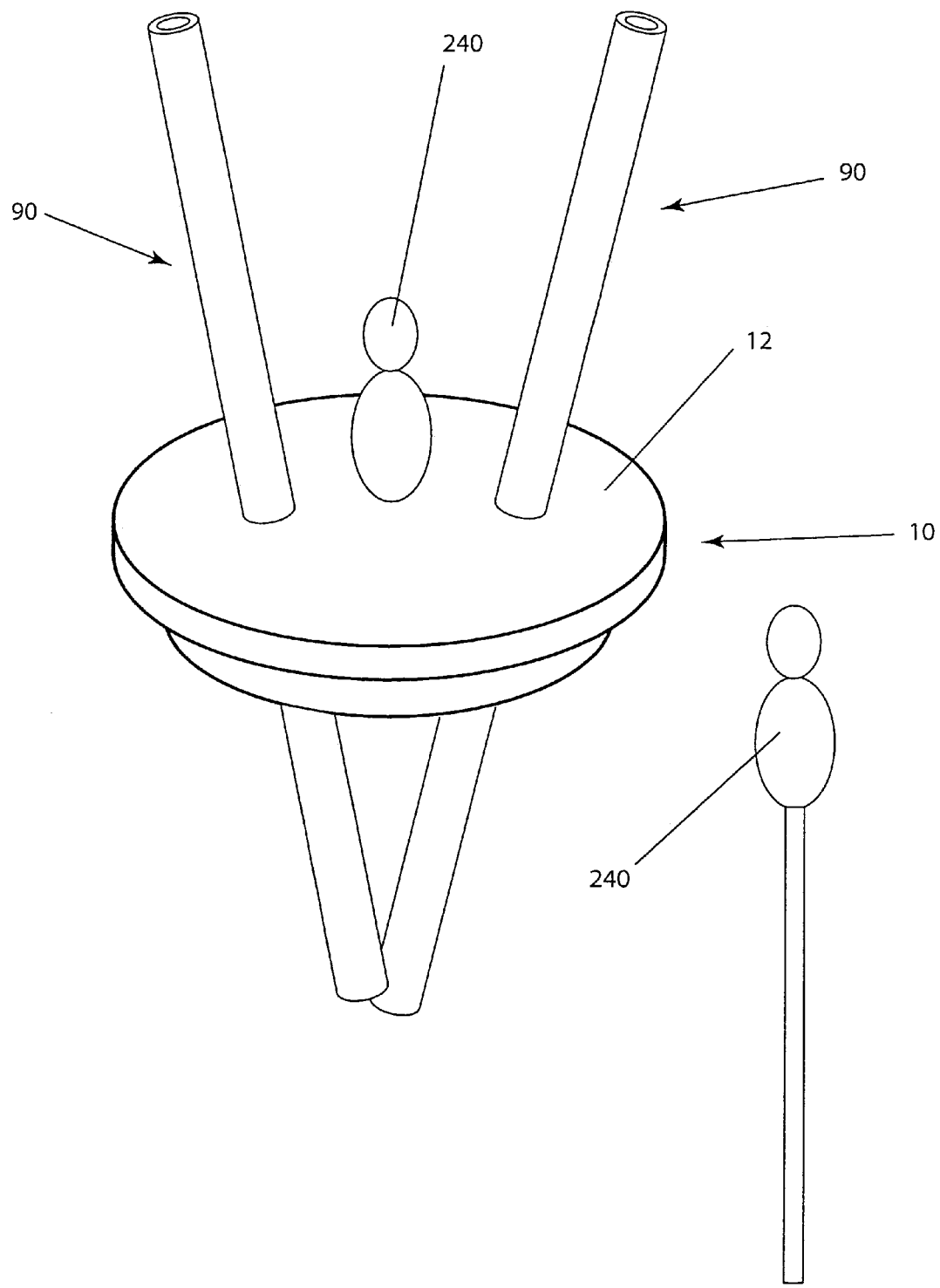
FIG. 19 is a perspective view of an alternative embodiment of the invention showing a figure that can be removed from the container lid and attached to an antenna.
Figure 20:
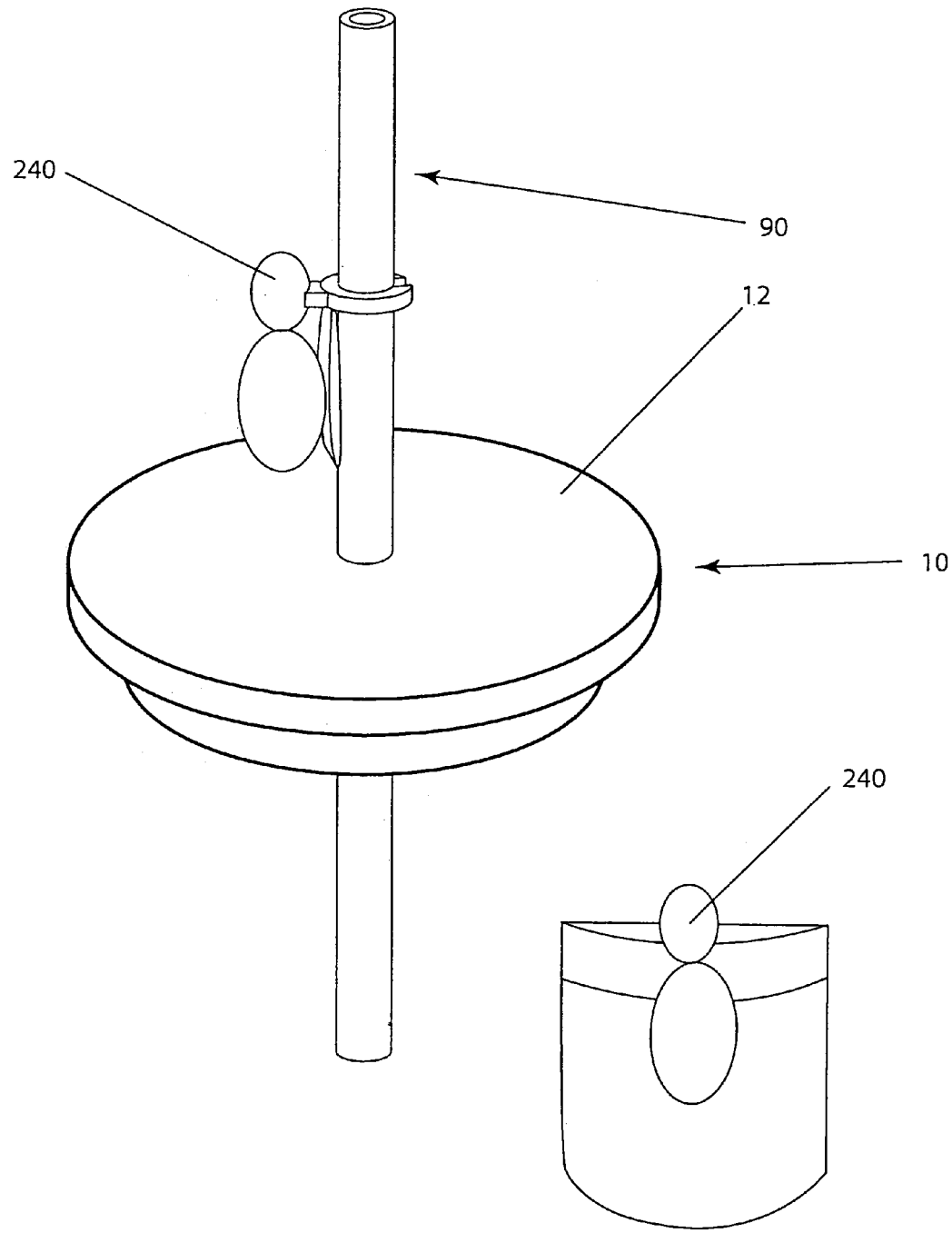
FIG. 20 is a perspective view of an alternative embodiment of the invention showing an object that can be removed from a straw and attached to an article of clothing.

FIGS. 6, 19 and 20, show that figure 240 is removably connected to the container lid 10 and/or straw 90. And, FIGS. 1–5 shows that the figure 240 can also be fixed to the container lid 10. For figure 240 to be removable, figure 240 must have connecting means for linking the lid 10 and/or straw 90 to the figure 240. A variety of methods of connecting the figure to the lid or straw can be utilized as is well known to a person skilled in the art.

To achieve illumination in a drink container 80 for the purpose of this invention, a light and/or lights 16 (drinking container LED light 214) must be angled or pointed downwards into a drinking container 80 from the bottom 11 of a container lid 10. Since the drinking container lid 10 has lights that are angled or pointed downwardly into the drinking container 80 an internal illumination is achieve in the drinking container 80 and its liquid contents. If a container lid 10 is attached to a drinking container 80 by the use of connecting means 60 then the internal illumination can be further enhanced. When any activating mechanism (i.e. manual on/off switch 155; photo cell 165; photo cell detector 167 and emitter light 166; manual on/off switch 155 and a photo cell 165; manual on/off switch 155, a photo cell detector 167 and emitter light 166; magnet switch; and/or sound activated switch) is triggered an electrical pulse is sent to the circuit board 42, which in turn sends an electrical pulse to the drinking container LED light 214 to illuminate the drinking container 80.

To achieve illumination in the container lid 10 for the purpose of this invention, a light and/or lights 16 (container lid LED light 216) must be placed in the container lid 10. When any activating mechanism (i.e. manual on/off switch 155; photo cell 165; photo cell detector 167 and emitter light 166; manual on/off switch 155 and a photo cell 165; manual on/off switch 155, a photo cell detector 167 and an emitter light 166; magnet switch; and/or sound activated switch) is triggered an electrical pulse is sent to the circuit board 42, which in turn sends an electrical pulse to the container lid LED light 216 to illuminate the container 10.

FIG. 4 shows in the preferred embodiment of this invention, the container lid 10 is constructed with reflective angles 47. Additionally, reflective angles 47 can be positioned inside the chamber 20 of the lid 10 to further enhance the illumination of the lid 10. It should be kept in mind that reflective angles 46 can be adjusted along with the position of the container lid LED light 216 to vary the intensity of the internal illumination within the chamber 20 of the lid 10 to achieve the desired use and special effect.

The sound generator 300 should comprise sound generating means in the form of a sound generating electronic circuit board on a printed circuit board 42 and a speaker 310. A variety of such circuits can be utilized as is well known to a person skilled in the art. It should also be kept in mind that a variety of other configurations well known to a person skilled in the art could be utilized to generate sound in a container lid.

To activate the sound generator 300, for the purpose of this invention, an activating mechanism (i.e. manual on/off switch 155; photo cell 165; manual on/off switch 155 and a photo cell 165; manual on/off switch 155, a photo cell detector 167 and an emitter light 166; magnet switch; and/or sound activated switch) must be triggered, which sends an electrical pulse to the sound generating portion of the circuit board 42, the speaker 310 powered to operate gives out sound for the user.

The smell generating means 350 should be comprised of an aroma producing liquid and an electrical heater. The aroma producing liquid is placed on a removable cartridge. The removable cartridge should be placed on an electrical heater, which is periodically energized by an electrical pulse when the activating mechanism is triggered. It should be kept in mind that a variety of other configurations well known to a person skilled in the art could be utilized to generate smell in a container lid.

To activate the smell generator 350, for the purpose of this invention, an activating mechanism (i.e. manual on/off switch 155; photo cell 165; manual on/off switch 155 and a photo cell 165; manual on/off switch 155, a photo cell detector 167 and an emitter light 166; magnet switch; and/or sound activated switch) must be triggered, which sends an electrical pulse to the circuit board 42, which in turn sends an electrical pulse to an electrical heater which in turn heats the removable cartridge with the aroma producing liquid, thereby generating the smell and/or odor.

The movement creating means 390 for the moveable object comprises an electric motor 400, a drive shaft 410, a wheel 425, a post 420, stability guides 415, and an object 450 that can be removably attached to the post 420. The inside portion of the wheel 425 should be comprised of teeth, those teeth connect with the teeth of the drive shaft 410 of the electric motor 400. The speed of the object is achieved by combination of the amount of teeth on the drive shaft wheel and the speed of the motor. Connected to the wheel 425 is a post 420 that is put into motion when the wheel 425 is rotated. When the post 420 is put into motion the post will travel along the designated path 460 of the container lid 10. Stability guides 415 are used to keep the wheel in place. The stability guides can be comprised of ball bearings or a Teflon coating. It should be kept in mind that a variety of other configurations well known to a person skilled in the art could be utilized to generate movement in an object connected to a container lid.

FIGS. 15–18, shows a designated path 460 in which an object 450 can put into motion on the container lid 10.

To activate the movement creating means 390, for the purpose of this invention, an activating mechanism (i.e. manual on/off switch 155; photo cell 165; manual on/off switch 155 and a photo cell 165; manual on/off switch 155, a photo cell detector 167 and an emitter light 166; magnet switch; and/or sound activated switch) must be triggered, which sends an electrical pulse to the circuit board 42, which in turn sends an electrical pulse to motor 400, which activates the drive shaft 410, thereby rotating the wheel 425 and creating movement in the post 425 and object 450 removable attached.

Figure 16:
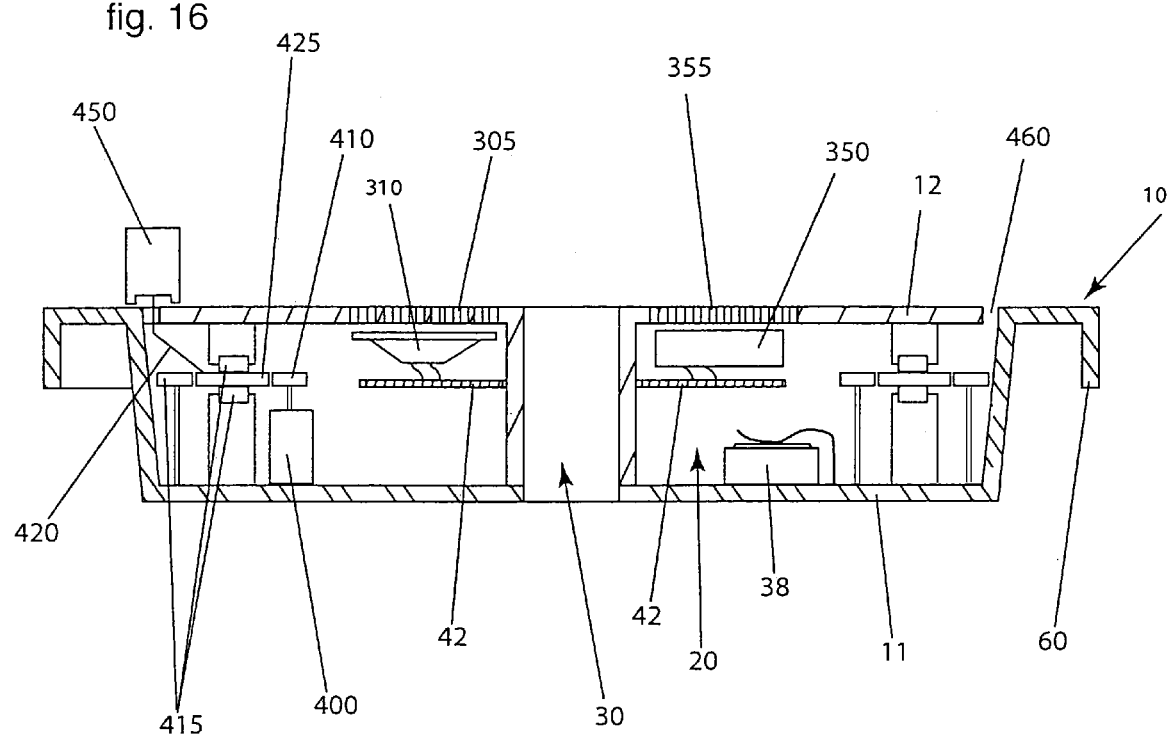
FIG. 16 is a vertical sectional view of one embodiment of the invention displaying a drinking container lid with a smell generator and sound generator and movement creating means for placing an object into motion on a designated path, showing the internal connections.
Figure 17:
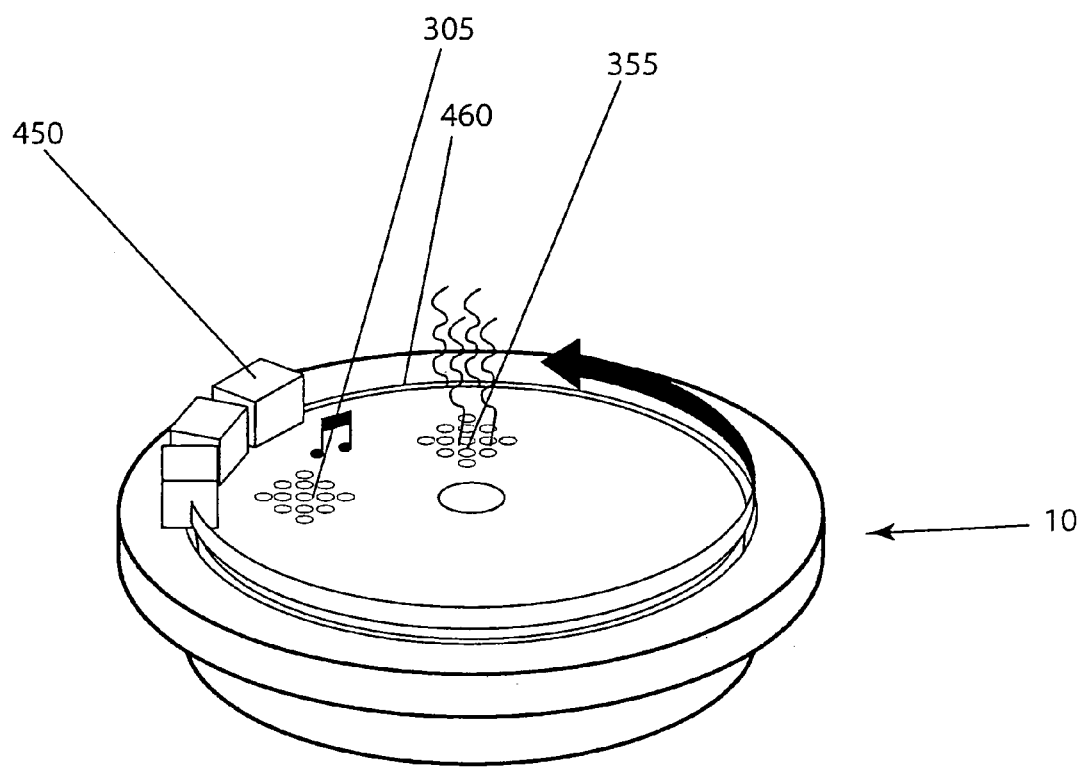
FIG. 17 is a perspective view of a drinking container lid emitting sound and smell and also having an object in motion on the container lid.
Figure 18:
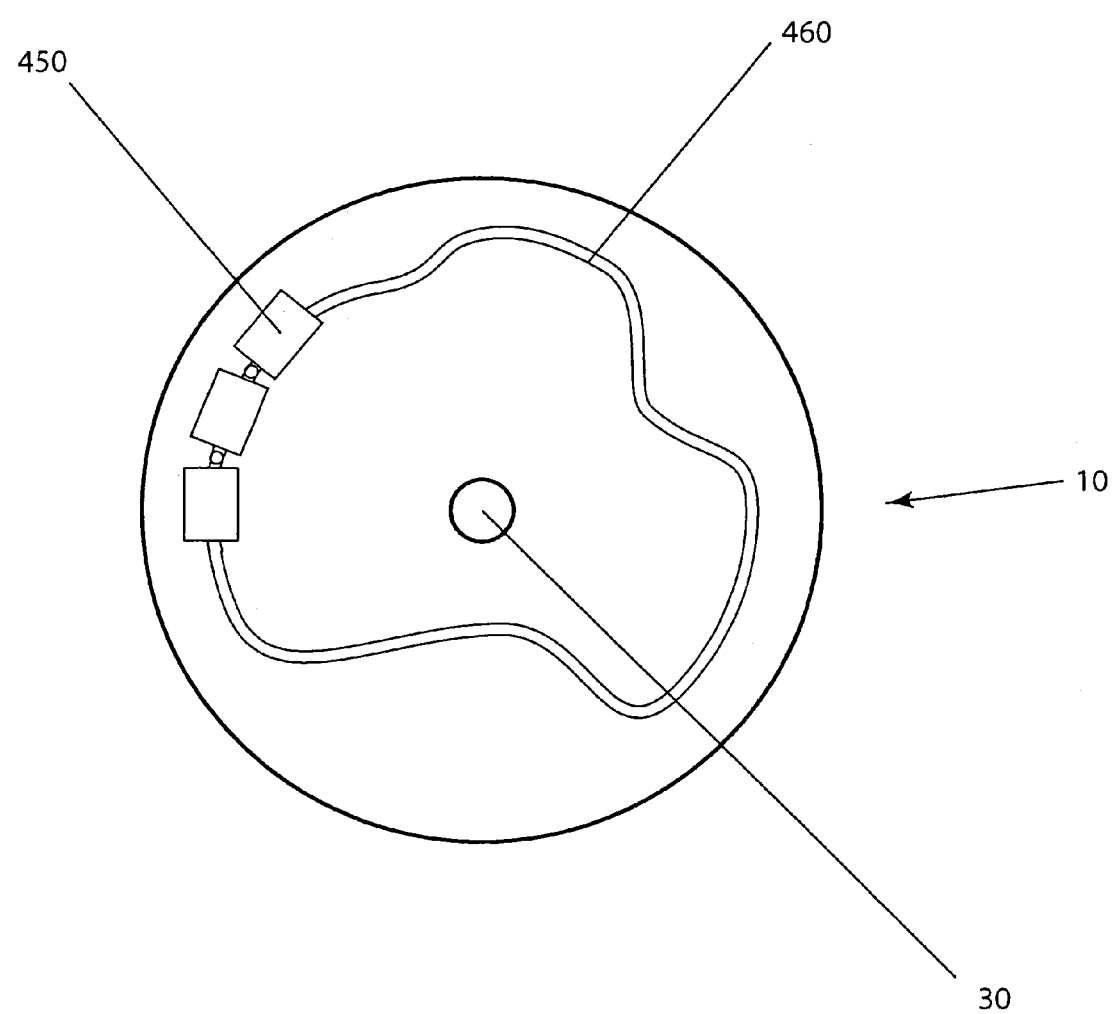
FIG. 18 is a top view of an alternative path on which a toy train can be put into motion on the container lid.

FIG. 16 shows in an alternative embodiment of this invention, a drinking container lid equipped with a smell generator 350, a sound generator 300, and a movement creating means 390. Note that the activating mechanism (i.e. manual on/off switch 155; photo cell 165; photo cell detector 167 and emitter light 166; manual on/off switch 155 and a photo cell 165; manual on/off switch 155, a photo cell detector 167 and an emitter light 166; magnet switch; and/or sound activated switch) cannot be seen from this particular angle. When the activating mechanism is triggered, an electrical pulse is sent to the circuit board 42, which in turn sends electrical pulses to: (1) the smell generator 350 to produce smell, (2) the sound generator 300 to produce sound, and (3) the motor 400, which activates the drive shaft 410, thereby rotating the wheel 425 and creating movement in the post 425 and moveable object 450 removable attached to the post 425. FIG. 17 shows the special effects producing mechanisms activated and producing sound and smell and movement in a moveable object 450.

While the description above refers to particular embodiments of the present invention, it will be understood that many modifications may be made without departing from the spirit thereof. The presently disclosed embodiments are therefore to be considered in all respects as illustrative and not restrictive

What is claimed is:

1. A special effects drinking lid and straw comprising:
    a container lid having a top, a bottom, an exterior side wall, and a straw hole;
    said straw hole forms an interior side wall in said container lid;
    a straw having a body, which is at least semi-transparent;
    said straw can be inserted into and removed from said straw hole of said container lid;
    a circuit board and a power source, mounted within said container lid;
    activating means for triggering a special effects mechanisms;
    said activating means comprises a photo cell having a small plate which is fastened to said interior side wall of said straw hole in said container lid;
    said circuit board, said power source, said special effects mechanisms, and said activating means are electronically connected to each other;
    said special effects mechanisms are attached to said container lid;
    wherein a liquid flows through a passageway of said straw, said photo cell will sense a change in luminosity of said straw thereby generating an electrical pulse in said photo cell, said electrical pulse is then sent from said photo cell to said circuit board, which in turn triggers said special effects mechanisms.

2. The special effects drinking lid and straw of claim 1, wherein said special effects mechanism comprises an illuminating means having:
    at least one drinking container light angled downwardly from said container lid into a drinking container to illuminate said drinking container;
    at least one straw light positioned around said straw hole of said container lid to illuminate said straw; and
    at least one container lid light positioned in said container lid to illuminate said container lid;
    wherein said special effects mechanism is triggered said drinking container lights will internally illuminates said drinking container and said liquid contents from within;
    wherein said liquid contents contain bubbles a further enhancing illuminating effect will occur in said drinking container;
    wherein said special effects mechanism is triggered said straw lights will internally and externally illuminated said straw; and
    wherein said special effects mechanism is triggered said container lid lights will internally and externally illuminate said container lid.

3. The special effects drinking lid and straw of claim 1, wherein said special effects mechanism comprises an illuminating means having at least one drinking container light angled downwardly from said container lid into drinking container to illuminate said drinking container;
    wherein said special effects mechanism is triggered said drinking container lights will internally illuminates said drinking container and said liquid contents from within; and
    wherein said liquid contents contain bubbles a further enhancing illuminating effect will occur in said drinking container.

4. The special effects drinking lid and straw of claim 1, wherein said special effects mechanism comprises an illuminating means having at least one straw light positioned around said straw hole of said container lid to illuminate said straw; and
    wherein said special effects mechanism is triggered said straw will internally and externally illuminated said straw.

5. The special effects drinking lid and straw of claim 1, wherein said special effects mechanism comprises an illuminating means having at least one container lid light that is positioned in said container lid to illuminate said container lid; and
    wherein said special effects mechanism is triggered said container lid lights will internally and externally illuminate said container lid.

6. The special effects drinking lid and straw of claim 1, wherein said special effects mechanism comprises smell generating means having:
    an aroma producing liquid;
    an electric heater; and
    said aroma producing liquid is positioned on said electric heater;

wherein said special effects mechanism is triggered said electrical pulse is sent to said electrical heater which in turn heats said aroma producing liquid, thereby generating the smell.

7. The special effects drinking lid and straw of claim 1, wherein said special effects mechanism comprises smell generating means having:
   an aroma producing liquid that is placed on a removable cartridge;
   an electrical heater; and
   said removable cartridge containing said aroma producing liquid is positioned on said electric heater;
   wherein said special effects mechanism is triggered said electrical pulse is sent to said electrical heater which in turn heats said removable cartridge with said aroma producing liquid, thereby generating the smell.

8. The special effects drinking lid and straw of claim 1, wherein said special effects mechanism comprises smell generating means that produce a smell that is the same as the taste that a user gets when said user drinks said liquid.

9. The special effects drinking lid and straw of claim 1, wherein said special effects mechanism comprises sound generating means having:
   a sound generating electronic circuit board on said circuit board;
   a speaker; and
   said sound generating electronic circuit board is connected to said speaker;
   wherein said special effects mechanism is triggered said electrical pulse is sent to said sound generating portion of said circuit board, said speaker is powered to give out sound.

10. The special effects drinking lid and straw of claim 1, wherein said special effects mechanism comprises movement creating means having:
    an electronic motor;
    a drive shaft;
    said drive shaft is connected to said electric motor;
    a wheel having an inside and a outside portion;
    said inside portion of said wheel has one or more teeth;
    said teeth of said inside portion of said wheel is connected to one or more teeth of said drive shaft;
    a post that is connected to said wheel
    at least one stability guide that is used to keep said wheel in place;
    an object that is removably attached to said post;
    wherein said special effects mechanism is triggered said electrical pulse is sent to said motor, which activates said drive shaft, thereby rotating said wheel and creating movement in said post and said object.

11. The special effects drinking lid and straw of claim 1, wherein said straw further comprises:
    said body having a thick straw wall containing at least one notch; and
    said notch is positioned at a location across from said straw hole;
    wherein an illuminating means are placed around said notch, said body of said straw will be internally and externally illuminated.

12. The special effects drinking lid and straw of claim 1, wherein said straw further comprises:
    said body having a thick straw wall containing at least one recess; and
    said recess is positioned at a location across from said straw hole;
    wherein an illuminating means are placed around said recess, said body of said straw will be internally and externally illuminated.

13. The special effects drinking lid and straw of claim 12, wherein said recess of said straw wall is angled upwardly, said illuminating means can be positioned in said recess to illuminate a top portion of said body of said straw.

14. The special effects drinking lid and straw of claim 12, wherein said recess of said straw wall is angled downwardly, said illuminating means can be positioned in said recess to illuminate a bottom portion of said body of said straw.

15. The special effects drinking lid and straw of claim 12, wherein a first recess of said straw wall is angled downwardly and a second recess of said straw wall is angled upwardly, said illuminating means can be positioned in said first and second recesses to illuminate a bottom and a top portion of said body of said straw.

16. A special effects drinking lid and straw comprising:
    a container lid having a top, a bottom, an exterior side wall, and a straw hole;
    said straw hole forms an interior side wall in said container lid;
    a straw having a body, which is at least semi-transparent;
    said straw can be inserted into and removed from said straw hole of said container lid;
    a circuit board and a power source, mounted within said container lid;
    activating means for triggering a special effects mechanisms;
    said activating means comprises an emitter light fastened to said interior side wall of said straw hole and a photo cell detector having a small plate which is also fastened to said interior side wall of said straw hole, and said photo cell detector is positioned across from said emitter light;
    said circuit board, said power source, said special effects mechanisms, and said activating means are electronically connected to each other;
    said special effects mechanisms are attached to said container lid;
    wherein a liquid flows through a passageway of said straw, a beam of light that is sent from said emitter light to said photo cell detector is disrupted causing a change in luminosity of said straw thereby generating an electrical pulse in said photo cell detector, said electrical pulse is then sent from said photo cell detector to said circuit board, which in turn triggers said special effects mechanisms.

17. The special effects drinking lid and straw of claim 16, wherein said special effects mechanism comprises an illuminating means having:
    at least one drinking container light angled downwardly from said container lid into a drinking container to illuminate said drinking container;
    at least one straw light positioned around said straw hole of said container lid to illuminate said straw; and
    at least one container lid light positioned in said container lid to illuminate said container lid;
    wherein said special effects mechanism is triggered said drinking container lights will internally illuminates said drinking container and said liquid contents from within;
    wherein said liquid contents contain bubbles a further enhancing illuminating effect will occur in said drinking container;

wherein said special effects mechanism is triggered said straw lights will internally and externally illuminated said straw; and wherein said special effects mechanism is triggered said container lid lights will internally and externally illuminate said container lid.

18. The special effects drinking lid and straw of claim 16, wherein said special effects mechanism comprises an illuminating means having at least one drinking container light angled downwardly from said container lid into drinking container to illuminate said drinking container;

wherein said special effects mechanism is triggered said drinking container lights will internally illuminates said drinking container and said liquid contents from within; and wherein said liquid contents contain bubbles a further enhancing illuminating effect will occur in said drinking container.

19. The special effects drinking lid and straw of claim 16, wherein said special effects mechanism comprises an illuminating means having at least one straw light positioned around said straw hole of said container lid to illuminate said straw; and wherein said special effects mechanism is triggered said straw will internally and externally illuminated said straw.

20. The special effects drinking lid and straw of claim 16, wherein said special effects mechanism comprises an illuminating means having at least one container lid light that is positioned in said container lid to illuminate said container lid; and wherein said special effects mechanism is triggered said container lid lights will internally and externally illuminate said container lid.

21. The special effects drinking lid and straw of claim 16, wherein said special effects mechanism comprises smell generating means having:

an aroma producing liquid;
an electric heater; and
said aroma producing liquid is positioned on said electric heater;
wherein said special effects mechanism is triggered said electrical pulse is sent to said electrical heater which in turn heats said aroma producing liquid, thereby generating the smell.

22. The special effects drinking lid and straw of claim 16, wherein said special effects mechanism comprises smell generating means having:

an aroma producing liquid that is placed on a removable cartridge;
an electrical heater; and
said removable cartridge containing said aroma producing liquid is positioned on said electric heater;
wherein said special effects mechanism is triggered said electrical pulse is sent to said electrical heater which in turn heats said removable cartridge with said aroma producing liquid, thereby generating the smell.

23. The special effects drinking lid and straw of claim 16, wherein said special effects mechanism comprises smell generating means that produce a smell that is the same as the taste that a user gets when said user drinks said liquid.

24. The special effects drinking lid and straw of claim 16, wherein said special effects mechanism comprises sound generating means having:

a sound generating electronic circuit board on said circuit board;
a speaker; and
said sound generating electronic circuit board is connected to said speaker;
wherein said special effects mechanism is triggered said electrical pulse is sent to said sound generating portion of said circuit board, said speaker is powered to give out sound.

25. The special effects drinking lid and straw of claim 16, wherein said special effects mechanism comprises movement creating means having:

an electronic motor;
a drive shaft;
said drive shaft is connected to said electric motor;
a wheel having an inside and a outside portion;
said inside portion of said wheel has one or more teeth;
said teeth of said inside portion of said wheel is connected to one or more teeth of said drive shaft;
a post that is connected to said wheel
at least one stability guide that is used to keep said wheel in place;
an object that is removably attached to said post;
wherein said special effects mechanism is triggered said electrical pulse is sent to said motor, which activates said drive shaft, thereby rotating said wheel and creating movement in said post and said object.

26. The special effects drinking lid and straw of claim 16, wherein said straw further comprises:

said body having a thick straw wall containing at least one notch; and
said notch is positioned at a location across from said straw hole;
wherein an illuminating means are placed around said notch, said body of said straw will be internally and externally illuminated.

27. The special effects drinking lid and straw of claim 16, wherein said straw further comprises:

said body having a thick straw wall containing at least one recess; and
said recess is positioned at a location across from said straw hole;
wherein an illuminating means are placed around said recess, said body of said straw will be internally and externally illuminated.

28. The special effects drinking lid and straw of claim 27, wherein said recess of said straw wall is angled upwardly, said illuminating means can be positioned in said recess to illuminate a top portion of said body of said straw.

29. The special effects drinking lid and straw of claim 27, wherein said recess of said straw wall is angled downwardly, said illuminating means can be positioned in said recess to illuminate a bottom portion of said body of said straw.

30. The special effects drinking lid and straw of claim 27, wherein a first recess of said straw wall is angled downwardly and a second recess of said straw wall is angled upwardly, said illuminating means can be positioned in said first and second recesses to illuminate a bottom and a top portion of said body of said straw.

31. A special effects drinking lid and straw comprising:

a container lid having a top, a bottom, an exterior side wall, and a straw hole;
said straw hole forms an interior side wall in said container lid;
a straw;
said straw can be inserted into and removed from said straw hole of said container lid;
a circuit board and a power supply mounted within said container lid;

at least one activating means for triggering an illuminating mechanism;

said circuit board, said power source, said illuminating mechanism, and said activating means are electronically connected to each other;

said illuminating mechanism is connected to said container lid;

said illuminating mechanism comprises at least one drinking container light angled downwardly from said container lid into a drinking container to illuminate said drinking container, wherein said activating means is triggered, an electrical pulse is sent from said activating means to said circuit board, which in turn triggers said illuminating mechanism;

wherein said illuminating mechanism is triggered said drinking container lights will internally illuminates said drinking container and said liquid contents from within;

wherein said liquid contents contain bubbles a further enhancing illuminating effect will occur in said drinking container.

32. A special effects drinking lid and straw comprising:

a container lid having a top, a bottom, an exterior side wall, and a straw hole;

said straw hole forms an interior side wall in said container lid;

a straw;

said straw can be inserted into and removed from said straw hole of said container lid;

a circuit board and a power supply mounted within said container lid;

at least one activating means for triggering an illuminating mechanism;

said circuit board, said power source, said illuminating mechanism, and said activating means are electronically connected to each other;

said illuminating mechanism is connected to said container lid;

said illuminating mechanism comprises at least one straw light positioned around said straw hole of said container lid to illuminate said straw, wherein said activating means is triggered, an electrical pulse is sent from said activating means to said circuit board, which in turn triggers said illuminating mechanism;

wherein said illuminating mechanism is triggered said straw lights will internally and externally illuminated said straw.

33. The special effects drinking lid and straw of claim 32, wherein said straw comprises:

a body having a thick straw wall containing at least one recess; and said recess is positioned at a location across from said straw hole;

wherein an illuminating mechanism is placed around said recess, said body of said straw will be internally and externally illuminated.

34. The special effects drinking lid and straw of claim 33, wherein said recess of said straw wall is angled upwardly, said illuminating mechanism can be positioned in said recess to illuminate a top portion of said body of said straw.

35. The special effects drinking lid and straw of claim 33, wherein said recess of said straw wall is angled downwardly, said illuminating mechanism can be positioned in said recess to illuminate a bottom portion of said body of said straw.

36. The special effects drinking lid and straw of claim 33, wherein a first recess of said straw wall is angled downwardly and a second recess of said straw wall is angled upwardly, said illuminating mechanism can be positioned in said first and second recesses to illuminate a bottom and a top portion of said body of said straw.

37. A special effects drinking lid and straw comprising:

a container lid having a top, a bottom, an exterior side wall, and a straw hole;

said straw hole forms an interior side wall in said container lid;

a straw;

said straw can be inserted into and removed from said straw hole of said container lid;

an attaching means for connecting said container lid to a drinking container;

a circuit board and a power supply mounted within said container lid;

at least one activating means for triggering an illuminating mechanism;

said circuit board, said power source, said illuminating mechanism, and said activating means are electronically connected to each other;

said illuminating mechanism is connected to said container lid;

said illuminating mechanism comprises at least one container lid light positioned in said container lid to illuminate said container lid;

wherein said activating means is triggered, an electrical pulse is sent from said activating means to said circuit board, which in turn triggers said illuminating mechanism;

wherein said illuminating mechanism is triggered said container lid lights will internally and externally illuminate said container lid.

38. A special effects drinking lid and straw comprising:

a container lid having a top, a bottom, an exterior side wall, and a straw hole, said straw hole forms an interior side wall;

a straw having a body, which has a thick straw wall and a passageway for a liquid;

said body of said straw wall contains at least one recess;

said recess is positioned at a location across from said straw hole; said straw can be inserted into and removed from said straw hole of said container lid;

a circuit board and a power source, mounted within said container lid;

at least one activating mechanism for triggering an illuminating means; and said circuit board, said power supply, said activating mechanism, and said illuminating means are electronically connected to each other;

said illuminating means are attached to said container lid.

39. The special effects drinking lid and straw of claim 38, wherein said recess of said straw wall is angled upwardly, said illuminating means can be positioned in said recess to illuminate a top portion of said body of said straw.

40. The special effects drinking lid and straw of claim 38, wherein said recess of said straw wall is angled downwardly, said illuminating means can be positioned in said recess to illuminate a bottom portion of said body of said straw.

41. The special effects drinking lid and straw of claim 38, wherein a first recess of said straw wall is angled downwardly and a second recess of said straw wall is angled upwardly, said illuminating means can be positioned in said first and second recesses to illuminate a bottom and a top portion of said body of said straw.

42. The special effects drinking lid and straw of claim 38, wherein said activating mechanism can include a manual switch, a sound activated switch, and a drink activated switch.

43. The special effects drinking lid and straw of claim 42, wherein said drink activated switch comprises:
- a photo cell having a small plate which is fastened to said interior side wall of said straw hole;
- said straw has a body, which is at least semi-transparent;
- said straw positioned in said straw hole;
- wherein a liquid flows through a passageway of said straw, said photo cell will sense a change in luminosity of said straw thereby generating an electrical pulse in said photo cell, said electrical pulse is then sent from said photo cell to said circuit board, which in turn triggers said illuminating means.

44. The special effects drinking lid and straw of claim 42, wherein said drink activated switch comprises:
- an emitter light fastened to said interior side wall of said straw hole;
- a photo cell detector having a small plate which is fastened to said interior side wall of said straw hole;
- said photo cell detector positioned across from said emitter light;
- said straw has a body, which is at least semi-transparent;
- said straw positioned in said straw hole;
- wherein a liquid flows through a passageway of said straw, a beam of light that is sent from said emitter light to said photo cell detector is disrupted causing a change in luminosity of said straw thereby generating an electrical pulse in said photo cell detector, said electrical pulse is then sent from said photo cell detector to said circuit board, which in turn triggers said illuminating means.

45. The special effects drinking lid and straw of claim 42, wherein said drink activated switch comprises:
- a magnet that is attached to a switch;
- said magnet that is attached to said switch is positioned around said straw hole inside said container lid;
- a corresponding magnet positioned adjacent to said straw passageway;
- said corresponding magnet has an arm that is permanently attached to said magnet;
- said arm of said corresponding magnet extends outwardly beyond said interior side wall of said container lid and into a channel where said liquid travels;
- wherein said liquid is sucked up said straw, said arm and attached magnet are moved in an upwardly direction from a point of rest, thereby causing said corresponding magnet attached to said switch to also move in an upwardly direction;

wherein said magnet that is attached to said switch is moved in an upwardly direction, said magnet activates said switch thereby sending an electrical pulse from said switch to said circuit board to activate said illuminating means.

46. A special effects drinking lid and straw comprising:
- a container lid having a top, a bottom, an exterior side wall, and a straw hole;
- said straw hole forms an interior side wall in said container lid;
- a straw;
- said straw can be inserted into and removed from said straw hole of said container lid;
- an attaching means for connecting said container lid to a drinking container;
- an electrical circuit assembly positioned within said container lid;
- said electrical circuit assembly is connected to at least one activating mechanism for triggering at least one special effect;
- said activating mechanism is connected to said special effects;
- said special effects are connected to said container lid.

47. The special effects drinking lid and straw of claim 46, wherein said straw comprises:
- a body having a thick straw wall containing at least one notch; and
- said notch is positioned at a location across from said straw hole;

wherein an illuminating means are placed around said notch, said body of said straw will be internally and externally illuminated.

48. The special effects drinking lid and straw of claim 46, wherein said straw comprises:
- a body having a thick straw wall containing at least one recess; and
- said recess is positioned at a location across from said straw hole;
- wherein an illuminating means are placed around said recess, said body of said straw will be internally and externally illuminated.

49. The special effects drinking lid and straw of claim 48, wherein said recess of said straw wall is angled upwardly, said illuminating means can be positioned in said recess to illuminate a top portion of said body of said straw.

50. The special effects drinking lid and straw of claim 48, wherein said recess of said straw wall is angled downwardly, said illuminating means can be positioned in said recess to illuminate a bottom portion of said body of said straw.

51. The special effects drinking lid and straw of claim 48, wherein a first recess of said straw wall is angled downwardly and a second recess of said straw wall is angled upwardly, said illuminating means can be positioned in said first and second recesses to illuminate a bottom and a top portion of said body of said straw.

52. The special effects drinking lid and straw of claim 46, wherein said electrical circuit assembly comprises:
- a circuit board; and
- a power source.

* * * * *